United States Patent
Kotab

(10) Patent No.: US 10,637,902 B2
(45) Date of Patent: Apr. 28, 2020

(54) SYSTEM, METHOD, AND COMPUTER PROGRAM PRODUCT FOR THE DIRECTING AND DISTRIBUTING OF MEDIA CONTENT

(71) Applicant: Dominic M. Kotab, San Jose, CA (US)

(72) Inventor: Dominic M. Kotab, San Jose, CA (US)

(*) Notice: Subject to any disclaimer, the term of this patent is extended or adjusted under 35 U.S.C. 154(b) by 183 days.

(21) Appl. No.: 14/599,381

(22) Filed: Jan. 16, 2015

(65) Prior Publication Data

US 2015/0201023 A1    Jul. 16, 2015

Related U.S. Application Data

(60) Provisional application No. 61/928,328, filed on Jan. 16, 2014.

(51) Int. Cl.
*H04L 29/06* (2006.01)
*H04W 4/08* (2009.01)

(52) U.S. Cl.
CPC ............ *H04L 65/60* (2013.01); *H04L 63/105* (2013.01); *H04L 65/4084* (2013.01); *H04L 65/4092* (2013.01); *H04W 4/08* (2013.01)

(58) Field of Classification Search
CPC . H04L 65/4084; H04L 65/60; H04L 65/4092; H04L 63/105; H04W 4/08
USPC ...................................................... 709/219
See application file for complete search history.

(56) References Cited

U.S. PATENT DOCUMENTS

| | | | |
|---|---|---|---|
| 2005/0172319 A1* | 8/2005 | Reichardt | G11B 27/105 725/52 |
| 2009/0109019 A1* | 4/2009 | Peterson | H04L 67/12 340/539.1 |
| 2009/0119734 A1* | 5/2009 | Deshpande | H04N 7/17318 725/118 |
| 2009/0164653 A1* | 6/2009 | Mandyam | H04L 65/601 709/231 |
| 2009/0190582 A1* | 7/2009 | Nambiath | H04N 21/43615 370/389 |
| 2010/0030808 A1* | 2/2010 | Ress | H04N 21/21 709/227 |
| 2012/0060100 A1* | 3/2012 | Sherwood | H04N 21/4122 715/748 |
| 2013/0174271 A1* | 7/2013 | Handal | G06F 17/30017 726/27 |
| 2014/0156865 A1* | 6/2014 | Giladi | H04L 65/4084 709/231 |
| 2014/0269757 A1* | 9/2014 | Park | H04L 49/201 370/432 |
| 2015/0049250 A1* | 2/2015 | Shao | H04N 21/4122 348/596 |
| 2015/0067106 A1* | 3/2015 | Jaynes | H04L 65/1089 709/219 |

* cited by examiner

*Primary Examiner* — Jason D Recek
(74) *Attorney, Agent, or Firm* — Zilka-Kotab, P.C.

(57) ABSTRACT

A system, method, and computer program product are provided for according to one embodiment. In use, the method includes selecting media content to be streamed; selecting one or more distribution channels to direct the streaming of the media content; and distributing the media content to the one or more distribution channels. Additional systems, methods, and computer program products are also presented.

14 Claims, 16 Drawing Sheets

SYSTEM, METHOD, AND COMPUTER PROGRAM PRODUCT FOR THE DIRECTING AND DISTRIBUTING OF MEDIA CONTENT

RELATED APPLICATIONS

This application claims benefit of U.S. Provisional Application No. 61/928,328, filed Jan. 16, 2014, which is herein incorporated by reference.

FIELD OF THE INVENTION

The present invention relates to directing and distributing of media content, and more particularly, this invention relates to directing and distributing of media content based on one or more permissions in a network system.

BACKGROUND

The distributing of media content to devices is commonly used. For example, a user may play a DVD disk which is displayed on a television, or a set-top box may be used to retrieve and display media content. However, modern distributing of media content lacks integration with other devices and/or systems (e.g. uniform integration of media content across multiple devices and between multiple devices, etc.).

There is thus a need for addressing these and/or other issues and voids associated with the prior art.

SUMMARY

Other aspects and advantages of the present invention will become apparent from the following detailed description, which, when taken in conjunction with the drawings, illustrate by way of example the principles of the invention.

A system, method, and computer program product are provided for according to one embodiment. In use, the method includes selecting media content to be streamed; selecting one or more distribution channels to direct the streaming of the media content; and distributing the media content to the one or more distribution channels. Additional systems, methods, and computer program products are also presented.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of directing and distributing media content and/or related systems and methods.

Figure 1:
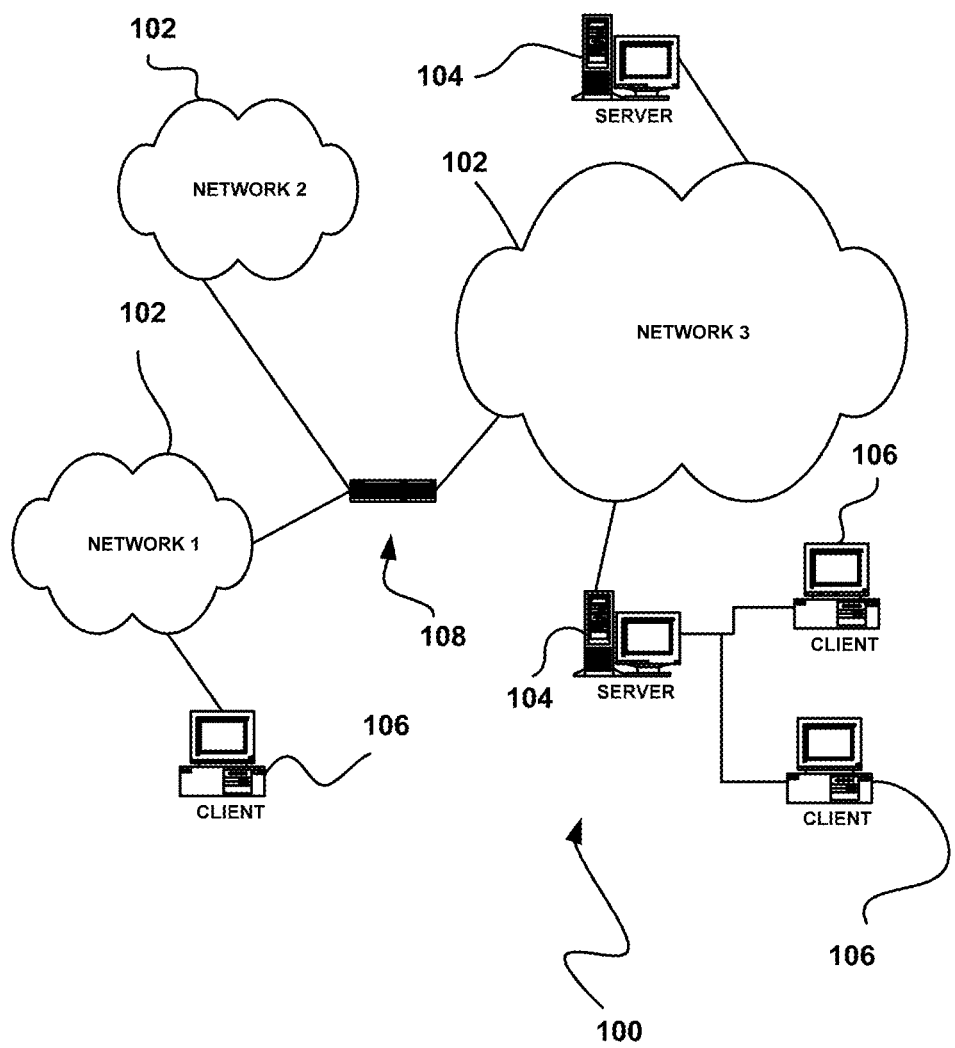
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
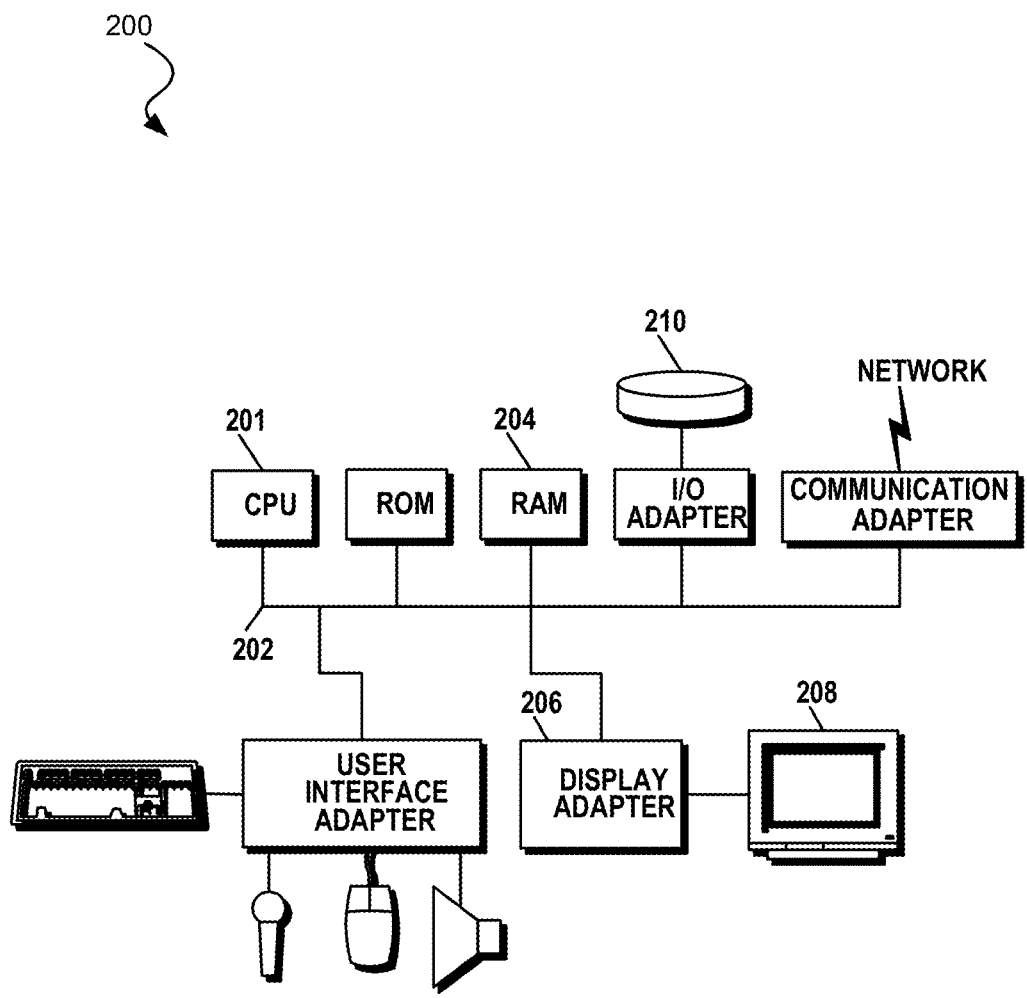
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
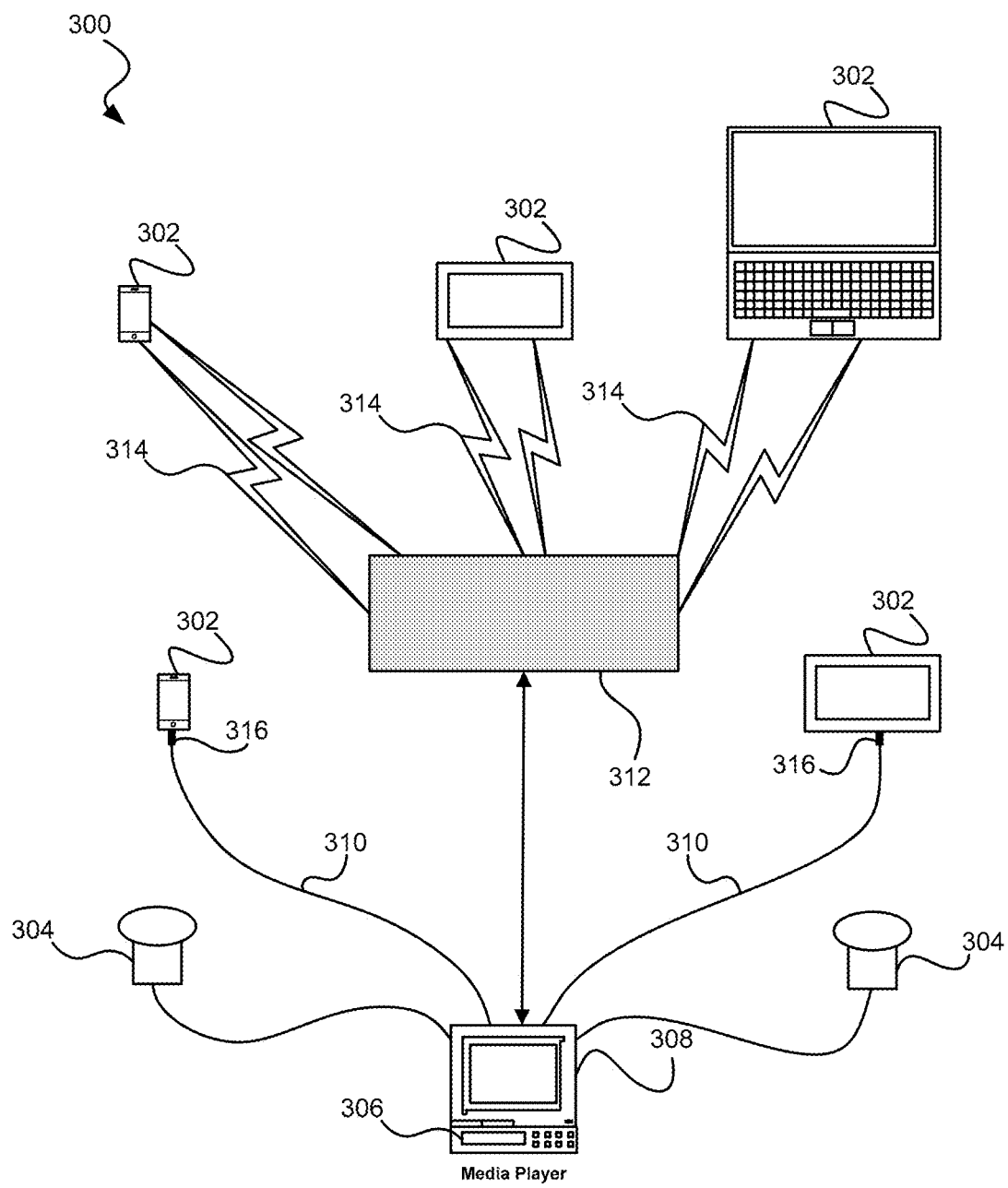
FIG. 3 illustrates a screensharing network architecture, in accordance with one possible embodiment.

FIG. 3 illustrates a screensharing network system 300, in accordance with one embodiment. As an option, the screensharing network system 300 may be implemented in conjunction with features from any other embodiment listed herein, such as those described with reference to the other FIGS. Of course, however, such screensharing network system 300 and others presented herein may be used in various applications and/or in permutations which may or may not be specifically described in the illustrative embodiments listed herein. Further, the screensharing network system 300 presented herein may be used in any desired environment.

As shown, FIG. 3 illustrates a screensharing network architecture 300 according to one embodiment. The screensharing network architecture 300, in accordance with one embodiment, may include a plurality of display devices 302. For example, in one embodiment, the display devices may include a tablet, Bluetooth device, mobile device, or any other device which includes a display. Of course, in other embodiments, the screensharing network architecture 300 shown may include more or fewer components than those shown.

As shown, the screensharing network architecture includes a media player device 308. For example, in one embodiment, the media player device may include a DVD player, Blueray player, USB media player, and/or any other player which can play media content. In other embodiments, the screensharing network architecture may include a plurality of media player devices.

Additionally, the screensharing network architecture 300 includes a processor 312 which uses a data transmission medium, such as Bluetooth, Local Area Network (LAN), device sharing, and/or any other communication protocol and/or method, to allocate 314 a screen sharing of the media of the media player device 308 to one or more display devices 302. In one embodiment, the media player device 308 includes a data receiving port 306, which may receive a media, including, for example, DVDs, USB hard drive devices, Blueray disks, and/or any other unit which may include media content.

As shown, direct data lines 310 are included in the screensharing network architecture and which may function as, for example, a display device 302 charging cord, a data transmission medium, a hardwire for interaction between display devices 302 and a media player device 308. Such direct data lines 310 may, in some embodiments, allow a user to participate in screensharing in situations including, for example, where a display device is not wifi capable, requires frequent charging, does not have a wireless processor adequate enough to buffer and/or process a wireless data allocation, and/or any other situation which may require use of a direct data line. In some embodiments, direct data lines may include connector pin 316, which may be, for example, an 8 pin charger, 16 pin charger, usb interface, and/or any other connector pin.

In other embodiments, direct data lines may be not be required. For example, a display device may be charged wirelessly, may have sufficient processors to buffer and/or process wireless data allocation, and/or may have one or more wireless protocols available (e.g. Bluetooth, Bluetooth High Speed, Wifi-Direct, Wi-Fi, etc.). In such an embodiment, the data transmission may occur wirelessly between display devices, media devices, and/or any other content playing and/or containing device.

In one embodiment, a user may switch from a wirelessly allocated 314 media screen sharing to a direct data line 310 screen sharing on a display device 302. Furthermore, in other embodiments, a user may switch from a direct data line 310 screening to a wirelessly allocated 314 media screen-sharing on a display device 302.

As shown, the screensharing network architecture 300 may include audio speaker 304 which may be synced with the media player device 308. In one embodiment, the audio speakers may be located in a car, airplane, train, presentation location, theater, on one or more devices, on one or more portable audio devices such as headphones, and/or any other speaker system. In another embodiment, one or more audio ports (not shown) may be used to control the broadcasting of audio to the audio speaker 304. In another embodiment, the broadcasting of audio to the audio speaker 304 may occur wirelessly and without any cables. Additionally, the screensharing network architecture 300 may include more or fewer components than those shown, in various embodiments.

In one embodiment, a display device 302 may function as a controller for the screensharing network architecture 300. For example, the display device may be used to play, pause, fast forward, redirect to a specified time, and/or control the media and/or the media player device, in any manner. In other embodiments, any assigned display device 302 could control the screen sharing of the media player device 308 to display devices 302. In a further embodiment, while media is being played, a display device 302 may disable the screen sharing of the media player device 308 and continue playing the media on a personal media player device 308. In other embodiments, more than one display device 302 and media player device 308 may each display a separate and personal media content. In other embodiments, any number of display devices 302 may be used to screenshare from a media player device 308. Still yet, in another embodiment, more than one media player devices 308 may be each used to screenshare a media content, and each media player device 308 may control which display devices 302 the media content is sent to. In another embodiment, a user may select on the display device 302 which incoming screenshare should be displayed. In a separate embodiment, if no selection by the user is made, an automatic selection of a screenshare stream may be displayed, based on a hierarchal ranking (e.g. master/ slave relationships between the devices, etc.) between the media streams. In a further embodiment, the media player device 308 may function as a display device 302.

Figure 4:
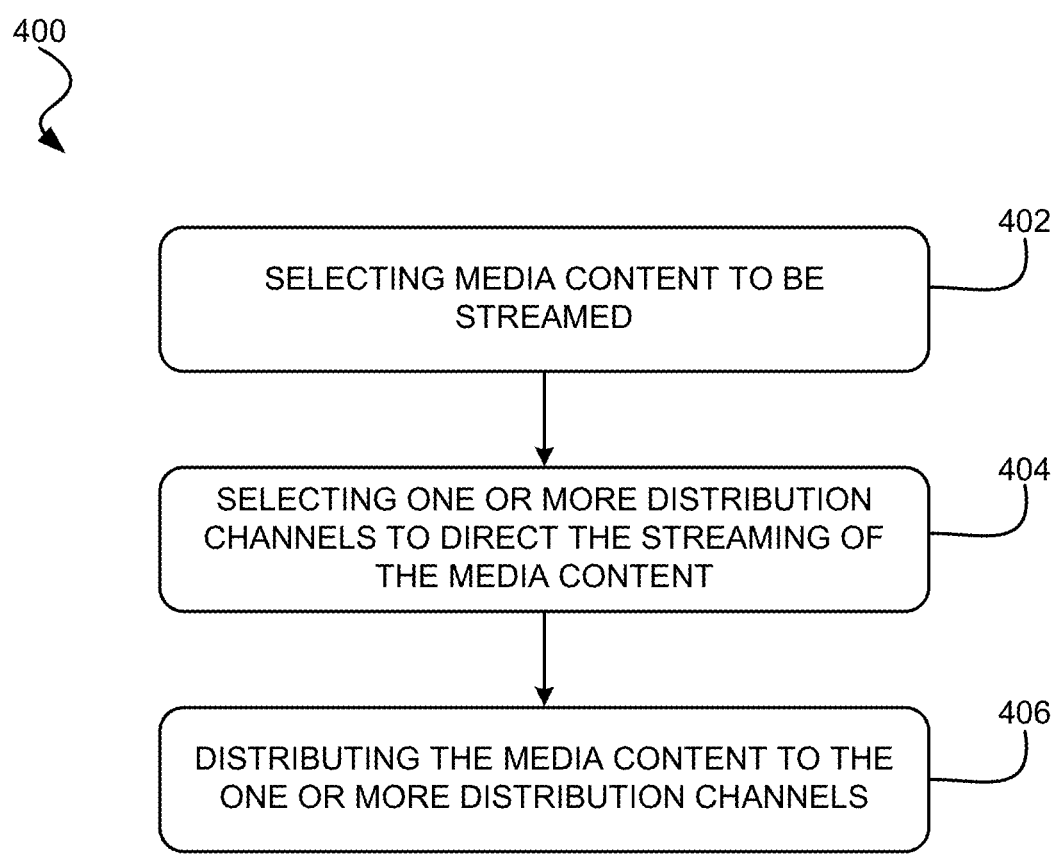
FIG. 4 shows a method for directing and distributing media content, in accordance with one possible embodiment.

FIG. 4 shows a method 400 for directing and distributing media streams, in accordance with one embodiment. As an option, the method 400 may be implemented in the context of the details of any of the other Figures. Of course, however, the method 400 may be carried out in any desired environment. Further, the aforementioned definitions may equally apply to the description below.

As shown, media content is selected to be streamed. See operation 402. Additionally, one or more distribution channels are selected to direct the streaming of the media content. See operation 404. Further, the media content is distributed to the one or more distribution channels. See operation 406.

In the context of the present description, media content refers to any content which can be displayed. For example, in one embodiment, photos (e.g. JPEG, TIFF, BMP, etc.), music (e.g. .mp3, radio stations, etc.), video files (e.g. .mp4, .avi, .mov, DVD, Blueray disks, etc.), may be displayed. In another embodiment, media content may include interactive content. For example, a game may be played on one device with one or more players, or may be played on a plurality of devices with one or more players. As such, media content may refer to any type of content which may be displayed on a device.

In one embodiment, the mobile content may be played and/or displayed on one or more devices, including mobile devices, built-in players (e.g. car systems, etc.), home entertainment systems, desktop computers, and/or any other device which may play and/or display the media content. In one embodiment, the mobile device may include any type of mobile device, including a cellular phone, a tablet computer, a handheld computer, a media device, a mobile device associated with a vehicle, a PDA, an e-reader, and/or any other type of mobile device capable of displaying mobile content.

In another embodiment, in the case where the device is used to play the media content, the device may be used to process (e.g. play the media content using the applicable codec, etc.) the media content file. In such an embodiment, the processing by the device may be used to stream to one or more other devices (i.e. the processing of the media content file occurs only on one device, etc.). Additionally, once the processing of the media content file has taken place on one device, the other devices may receive the presentation of the processed media content file (e.g. only receive a streaming of the file rather than the need to process it, etc.). In one embodiment, if a media content file has already been processed, it may be reprocessed by another device based on one or more settings (e.g. optimize audio, resize the video, decrease the frame rate, etc.).

In a separate embodiment, the device may offload some or all of the processing to other devices. For example, if media content was being displayed simultaneously on three separate devices, each with a different size screen, each may access the media content to play the file on the respective device. In such an embodiment, the processing by the individual device may include optimizing the file to be optimally displayed on the device. In a separate embodiment, if media content was being displayed simultaneously on three separate devices, each with a different size screen, just one device may be used to stream to all three devices. For example, one device may process the media content (including optimizing the streaming to account for more than one display size) and then stream the modified processed media content to all of the other devices. In such an embodiment, the processing device may send out the appropriately optimized media content to the appropriate device (e.g. based off of screen size request, etc.), or may send out a package of multiple optimizations to be selected automatically by the device or by the user of the device (e.g. select HD rather than SD quality, etc.).

Still yet, in another embodiment, the media content may not be stored on the device (e.g. stored in the cloud, on another device, on external/network drive, etc.). In such an embodiment, the processing may occur at least in part on the processing device. For example, in one embodiment, the processing device may access the media content and process it in parts. In some embodiments, the processing may occur in set partitions or sections, based off of a storage amount (e.g. every 100 mb, etc.), time (e.g. every 25 min, etc.), and/or any other feature. The processing device may process each set section and distribute the processed section to other devices (e.g. distribute device specific and optimized format, distribute package of optimized formats, etc.).

Further, in a separate embodiment processing of the media content may occur on more than one device. For example, any device capable of processing the media content may optimize the content for the device. The media content file and/or data therefore may be accessed simultaneously by more than one device, processed by each device, and then displayed on each device in an optimized manner. In the context of the present description, processing the media content includes rendering the media content in an optimized manner for the device display.

In this manner, media content may be retrieved by one or more devices. Additionally, media content may be streamed from a remote source to one or more devices, streamed from a local source (e.g. device, etc.) to one or more devices, and/or streamed from any other location to a device and/or display. Still yet, in another embodiment, if media is being processed by individual devices, then part of the source media content file may be saved temporarily on the device. For example, in one embodiment, a device buffer may be used to store part of the source media content, prior to the processing and/or displaying of the media content.

In a further embodiment, the device may be used to display the media content. For example, in various embodiments, the device may be incapable of processing the media content (e.g. the device functions may be simply a screen and/or display, device cannot render and/or optimize media content, etc.). In such an embodiment, the device may function solely to display media content, as streamed by another device. In another embodiment, the device may be capable of processing the media content, but may be used also solely to display media content, as streamed by another device. In this manner, media content may be displayed on one or more devices.

Additionally, in the context of the present description, a distribution channel refers to any network and/or device which is used to display the media content. For example, in one embodiment, the distribution channel network may include a wireless system (e.g. WLAN, Wi-Fi, Wi-Fi direct, Bluetooth, etc.), a wired system (e.g. LAN, Ethernet, dock connector, etc.), and/or any other network system which may be used to stream the media content. In a separate embodiment, a distribution channel device may include any device which may be used to display the media content. As such, a distribution channel may refer to the protocol used to transmit the media content, or may refer to the endpoint of where the media content is displayed. Of course, in other embodiments, distribution channel may also include devices located and/or connected via the cloud. In this manner, any device which may have access to and/or receive functionality from a network and/or device associated with the media content may be included as being part of the distribution channel and/or a distribution channel device.

In one embodiment, a user may select the media content to be streamed. The user may then select a network to stream the media content. In one embodiment, the media content to be streamed may be initially viewed via a cloud based connection, whereas one a media content is selected to be streamed, the system may prompt the user to select the network (e.g. use local WiFi connection, use a wired connection, use data connection, etc.) to be used for streaming to the device. Additionally, in one embodiment, selecting a network may also include setting a quality associated with the media content. For example, selecting a WiFi connection may display the media content at a higher resolution, whereas selecting a data connection may display the media content at a lower resolution to preserve data.

In one embodiment, once a media content is selected to be streamed, other devices on the network may select to view the media content. In this manner, users may have access to view media content based on another user's action. As an example, a first user may not have access to media content X. However, a second user may have access to media content X and begin streaming the content. In one embodiment, based on the second user's access to media content X, the first user may request access to media content X through the second user's access. In another embodiment, if the second user was connected to a local connection (e.g. WiFi, etc.), and selected to stream the media content to the second user's device, streaming using the network may cause such a stream to be made available to pre-approved (or public) users on the WiFi network connection as well.

In another embodiment, a user may select the media content to be streamed, and then select individual devices (i.e. the endpoints, etc.) to which the media content should be streamed. In a separate embodiment, the user may select the media content to be streamed, select the network to stream, and then select the individual devices on the network to which the media content should be streamed.

In one embodiment, the media content may be pushed from a master device to one or more other devices (e.g. slave devices, etc.). For example, in one embodiment, devices may be arranged via a hierarchy of permissions and/or settings, including, for example, detecting whether devices have been previously detected and/or categorized (i.e. if unknown, the device may assume a slave relationship unless changed by an administrator of the network, etc.), detecting whether the devices belong to preconfigured user (e.g. if user is parent or child, permissions will be automatically applied, etc.), detecting metadata associated with the device (e.g. device id, active user, etc.), and/or detecting any other information which may influence whether the device should be classified as a master or slave device.

Additionally, in various embodiments, the allocation of hierarchal relationships may be determined and applied automatically. For example, the network system may be preconfigured to always designate user X1 as the master over any other device in NETWORK1. In various embodiments, the network system may be configured based off of some protocol and/or connection (e.g. WiFi, Bluetooth, WiFi Direct, cable connection, etc.). If X1 is predesignated as the master over NETWORK1, then no other device and/or user may function as a master in NETWORK1. In one embodiment, if a non X1 device is detected, it may be automatically designated as a slave device to a X1 device on the network. In another embodiment, if a non X1 device is detected, a user interface may be presented on the X1 device requesting whether the non X1 device should be added in a slave relationship to the X1 device. In a separate embodiment, if a non X1 device is detected, a user interface may be presented on the non X1 device, requested permission to be controlled by the X1 device. In such an embodiment, limits may be placed on the control by the X1 device. For example, the X1 device may have permission to display media content on the non X1 device. However, the X1 device may be prevented and/or limited from accessing content on the non X1 device, from altering information on the non X1 device, and/or using the non X1 device in any other manner.

Of course, in other embodiments, the non X1 device may be configured such that the X1 device may have greater permissions and/or control of non X1 devices, including detecting and fetching media content from one or more non X1 devices, processing such media content, streaming such media content to one or more other devices (e.g. or displays, etc.), and/or using the non X1 devices in any other manner.

In one embodiment, if the detected non X1 device is identified for a first time, setup (e.g. pairing process, network identification, etc.) may include establishing permissions on the network (e.g. the ability of the master device to control and/or access content on the slave device, etc.). In subsequent pairings, the network may remember prior pairings to facilitate identification and/or distribution of content.

In another embodiment, a set of given permissions may have been associated with device XA1. At a later time, a master device may request additional permissions from the slave device (e.g. ability to access content, etc.). Or, in another embodiment, the slave device may grant greater access (e.g. allow access to files/folders, increase permission level for the associated master device, etc.) to the master device. Further yet, in another embodiment, the slave device may push content to the master device. In such a situation, the content received may first be sent as a request to the master device. If such a request is granted (e.g. based off of automatic settings, based off of user input, etc.), then the content from the slave device may be pushed to the master device.

In one embodiment, pushing content from a slave device to a master device may include transferring media content from a slave device to a master device. In this manner, the master device may then process and distribute the media content. In other embodiments, the master device may grant permissions (e.g. temporary permissions, permanent permissions, etc.) to allow the slave device to function in such a manner that the slave device can distribute the media content to other devices and/or displays. In this manner, the master device can control which slave device has permission to direct and distribute the media content.

In another embodiment, if the slave device has permission to distribute the media content, the slave device may, like the master device, process and then distribute the media content, distribute a package of optimized media content formats, and/or distribute the media content in any other manner.

Still yet, in one embodiment, the slave device may include media content stored not on the slave device (e.g. in the cloud, on an external drive, etc.). In such a scenario, the slave device may distribute the media content to other devices, in a manner consistent with how the master device would distribute the content (e.g. process the media content and then distribute, have each device process the content individually, etc.). In this manner, the slave device may function as a pseudo-master device, with enhanced permissions, but still under the control of the master device.

In some embodiments, more than one master device may exist. For example, in one embodiment, a mobile device may be associated with the master user and predesignated as a master device. Additionally, a car infotainment system may be predesignated as a master device. In such a scenario, both the car infotainment system and the mobile device may both function as master devices, including equal ability to control all slave devices, ability to control the distribution of media content, and/or any other control of the system.

In one embodiment, if more than one device is designated as a master device, a hierarchy of master devices may additionally be specified by the user. For example, in the case where two mobile devices and a car infotainment system have been designated as master devices, the car infotainment system may be designated as the first master, and the other master devices may be designated below the infotainment device.

In other embodiments, the master device may be temporarily revoked and/or suspended. For example, in one embodiment, if media content is being controlled by one device (e.g. the setup and distribution occurred through one master device, etc.), then other master devices may be disabled from controlling the media content until either the processing master device has finished displaying the media content, or the master device has transferred control of the media content to another master device (or to any other device) designated by the processing master device.

In another embodiment, the hierarchy of master devices may be based on the time at which the master device is registered on a network. For example, in one embodiment, a set location may have a designated network (e.g. wired system, wireless system, etc.) to which devices and displays may be connected. As master devices log on to the network, the order will be indicative of the master hierarchy (i.e. the first registered master device will be the control master, etc.).

In a further embodiment, the hierarchy of master devices may be based on device-to-device integration. For example, in one embodiment, a device may be designated as a central device. As master devices register to this central device, the order in which they register may determine the master hierarchy (i.e. the first registered master device will be the control master, etc.). In another embodiment, the central device may be a master device, or may be slave device.

In one embodiment, the slave device's permissions may be based on context. For example, in some embodiments, the slave device may have permission to stream video content to other devices and/or displays. However, the same slave device may not have permission to stream game content and/or other interactive material. In other embodiments, the context may be dependent on the content type (e.g. video, photos, music, games, etc.), geographic (e.g. slave device has increased permissions based on geography bounds, etc.), time (e.g. after being connected for xx minutes permissions are increased, etc.), frequency (e.g. after being connected xx number of times permissions are increased, etc.), user type (e.g. adult, child, student, teacher, etc.), group (e.g. marketing, advertising, managerial, etc.), position (e.g. manager, administrator, etc.), and/or any other form of data which may be used to determine the context.

In some embodiments, the master device may be constant. For example, a previously master-designated device may remain a master device for future interactions. Or, in another embodiment, a central device may always assign the permissions to the same device.

In other embodiments, the master device may not be constant. For example, a central hub may determine the master device based off of context, including, in one embodiment, granting master control to the device associated with the highest ranking individual. As such, the designation of master device may change based on who is connected to the network system (e.g. wired network, wireless network, device-to-device integration, central device integration, etc.).

As an example, a physical room may have multiple displays for displaying presentations. As employees work in the room, the employee with the highest designated position may have control of the slave devices in the room (e.g. the displays, etc.). In some embodiments, other devices in the room (e.g. personal mobile devices associated with other individuals, etc.) may be designated as slave devices (e.g. users accept slave designation while they are located in the room, etc.). However, if the president of the company enters the room, the control of the displays and of the slave devices may be automatically transferred to a device associated with the president. In other embodiments, the transfer may be manual, or may require some user interaction (e.g. displaying on the president's mobile device "Would you like to control this room?," etc.). In this manner, the master device may change based off of the context of the participants and the devices.

In another example, a car may have multiple displays and interactive devices. In some embodiments, at least some of these devices may be permanently integrated into the car system (e.g. incorporated into seat-backs, integrated into car deck, etc.). In other embodiments, at least some of these devices may be mobile (e.g. may be removed from the car, etc.). In such a situation, a child may be using a tablet and, based on the designation of being a child user, the tablet will be a slave device. However, if the tablet is passed to another user (e.g. a parent, an administrator), the user may login with credentials and the device may be automatically switched to functioning as a master device. In this manner, the master device may be based off of the user controlling the device.

In other embodiments, at least some elements and/or devices may remain constant while other devices and/or designations change. For example, in one embodiment, a central device may be designated as a constant master device. Other master devices (e.g. mobile devices, etc.) may continually change as the users of the device change. However, the central device may remain as a constant master device on the network system.

As an example, a classroom may include a central device which is associated with the classroom (e.g. based off of geographic location, etc.). As students enter and exit, the number of slave devices may be continually changing. Additionally, while a teacher is in the room, one or more devices associated with the teacher may be designated as master devices. However, as other users enter the room (e.g. administrators, etc.), the controlling master device may change (e.g. administrator may have ability to take control of the devices in the classroom, etc.). However, amidst the changing devices and/or permission levels, the classroom central device may continually function as a master device. For example, in one embodiment, the classroom may only have slave devices and the central master device. In such an embodiment, the central master device can function as any other master device. Additionally, even if other master devices were also associated with the network system, the central master device may still function as the controlling master device. Or, in other embodiments, the central device may display and/or control the hierarchy of master devices on the network system. In this manner, a central device may remain constant while other slave and master devices may change.

In one embodiment, a central device may control the distribution channels. For example, the central device may dictate that media content be streamed via a wired network, a wireless network, and/or any other connection or protocol. In other embodiments, the central device may dictate that media content be streamed directly to individual devices, and may manage all connected devices (e.g. maintain slave/master relationships, etc.).

In some embodiments, interaction with the network system may require the device to be present (e.g. within the range of the wireless network system, within range of the wired network system, within range of device to device communication, etc.). In other embodiments, interaction with the network system may occur remotely. For example, in one embodiment, a master device may remain a master device (over all other slave devices in the network system) even when not present within the actual network system.

As an example, a bus may be managed by a corporate entity. The corporate entity may include a master device for use in the bus to control all other devices and/or displays. The bus may also include a central device for communicating with the master device (associated with the corporate entity) and any other device detected on the bus. When the master device is away from the network system, the master device may still connect to the network system through an internet connection and/or any other remote connection interface system. The master device may contact the central device to administer to requests by other devices on the network system. Or, the master device may control, in some manner, what is being displayed on the network system. For example, in one embodiment, the bus system may be associated with a tour, and the central device in each network system (i.e. in each bus, etc.) may be controlled by one global master device. In this manner, the company may retain control in directing and distributing content.

Additionally, in another embodiment, an additional benefit of such a configuration is that real-time updates to the system can be applied and/or controlled. For example, in one embodiment, a system of pods or shuttles may autonomously transport individuals to and from a location. Having the capability of tailoring the content displayed for each group of passengers may allow greater personalization. As one example, a group of tourists taking a shuttle may not comprehend what is being said on the radio. The network system may detect one or more devices whose preferred language is not English. The network system may communicate this back to the central device and/or the master device, and the master device or central device (if the central device is functioning as a master device) may change what is being displayed and/or presented so that it is in the tourist's preferred language.

As another example, in one embodiment, a group of children may have content presented to them which would be different from content presented to adults. As such, advertisements and/or media may be tailored based on the context of those individuals and/or devices connected to the network system.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 5:
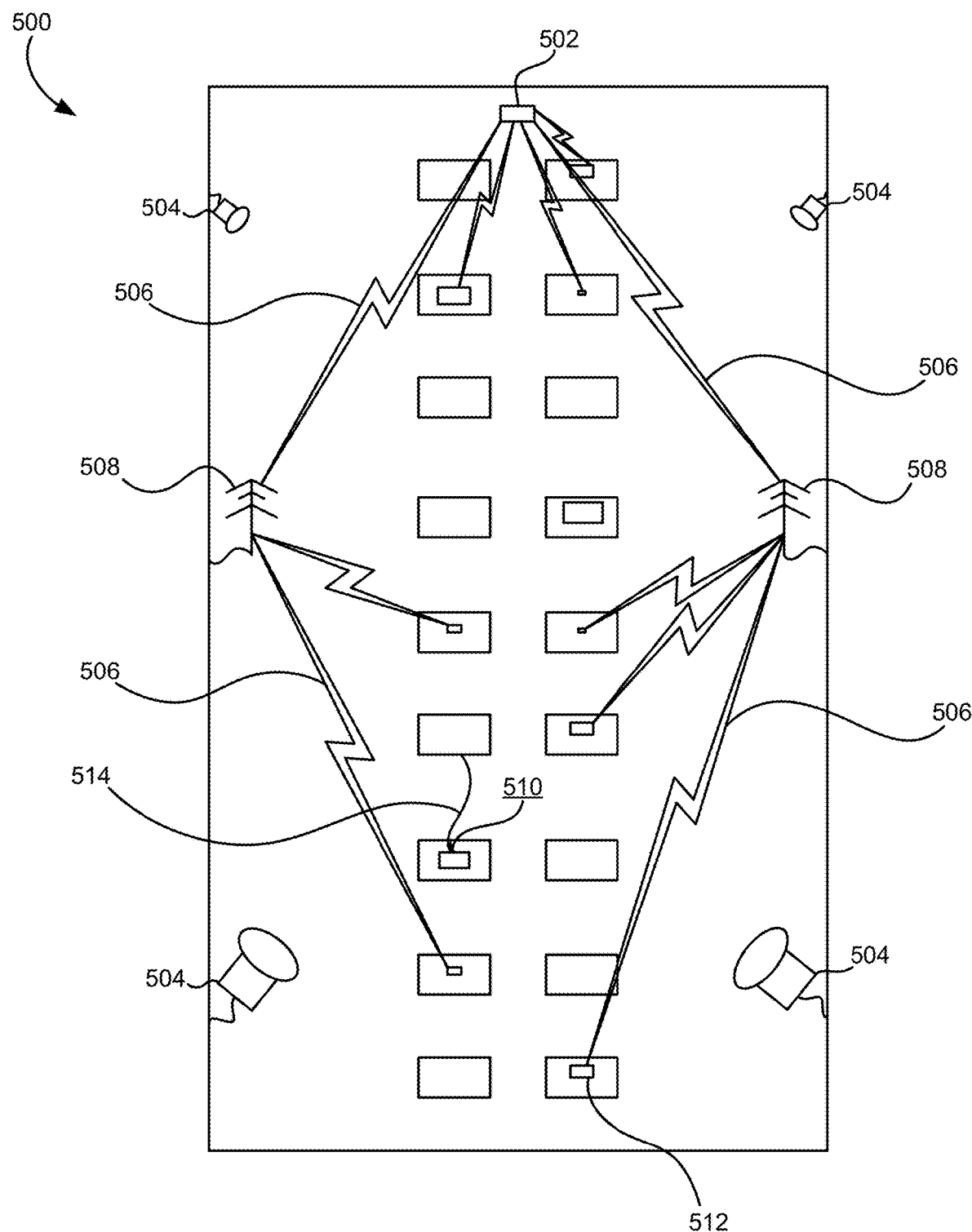
FIG. 5 shows an architecture for the directing and distributing of media content, in accordance with one possible embodiment.

FIG. 5 shows an architecture 500 for the directing and distributing of media content, in accordance with one embodiment. As an option, the architecture 500 may be implemented in the context of the details of any of the other Figures. Of course, however, the architecture 500 may be carried out in any desired environment. Further, the aforementioned definitions may equally apply to the description below.

As shown, the architecture 500 includes one or more media player devices 502, one or more audio speakers 504, a wireless network system 506, one or more signal repeaters 508, one or more connector pins 510, one or more display devices 512, and one or more direct data lines 514. Of course, in other embodiments, fewer or more features and/or items than those shown in 500 may be included.

In one embodiment, the architecture may function only as a wireless network system. For example, in various embodiments, the media player devices, audio speakers, and display devices may communicate via a wireless protocol (e.g. wifi, wifi direct, Bluetooth, etc.). In one embodiment, a connector pin and/or dock connector may allow the device to communicate wireless with the wireless network system. For example, in one embodiment, a device may not be wireless capable, but connecting to a connector pin and/or dock connector may provide the wireless resources to then communicate wirelessly.

Still yet, in one embodiment, the wireless network system may include one or more wireless networks. For example, the architecture may allow the devices to communicate device-to-device (e.g. Bluetooth, etc.) while still allowing each device to maintain a separate data connection (e.g. cellular network access, etc.). In such an embodiment, each device's network connectivity may contribute to the entire architecture's overall data connectivity. In one embodiment, the architecture may leverage each device's individual data connectivity to efficiently allocate, request, and retrieve content media. As an example, in one embodiment, the master device may detect a video associated with a slave device. The slave device may not have the video, however, stored on the actual device (i.e. the video may be stored in the cloud, etc.). The master device may begin to retrieve the video via the slave device and then broadcast it to the other display and media player devices. In such an embodiment, therefore, the slave device is used to retrieve the media content, and then send the media content to the master device for distribution. In another embodiment, the master device may distribute the data request among more than one data connected devices. For example, in one embodiment, a slave device may be associated with a video stored in the cloud. The master device may request more than one device (in addition to, or rather than, the host slave device) to retrieve one or more parts of the video, process the one or more parts, and then distribute the one or more parts to other display and media player devices. In this embodiment, the slave devices may be used to leverage each of its own data connection to provide a better (e.g. higher bit rate, higher quality, etc.) to the presentation of the media content.

In a separate embodiment, a master device may direct other slave devices to fetch and retrieve individual media content. Once retrieval begins, the master device may direct the presentation of the media content. For example, in one embodiment, the master device may temporarily grant a slave device the ability to stream the retrieved media content to the other master and slave devices and displays in the network system. Once the slave device has finished, the master device may revoke the ability and transfer such an ability to another slave device for presentation of the next media content, and so on. In this manner, the master device may direct the presentation of media content, while leveraging a network data connection for each device.

In another embodiment, the architecture may function only as a wired network system. In this system, the network system would be function as a closed system (e.g. no data connection, etc.). In one embodiment, the presentation of media content would be limited to that which is already stored on the devices connected to the network system. In such an embodiment, the master device may grant a slave device temporarily the ability to stream the media content to other devices connected to the network system. In a separate embodiment, the slave device may stream the media content directly to the master device, which may then distribute it to the other devices and/or displays on the network system. Still yet, in another embodiment, the master device may direct other slave devices to retrieve at least part of the media content from a particular slave device. Once retrieved, the individual slave devices may process (e.g. render the video and optimize it for various screen sizes, etc.) and then stream the content when needed to the other devices or displays on the network system.

In one embodiment, the wired system may include dock connectors, pin connectors, Ethernet connections, and/or any other types of connections to join the devices and/or displays together to create a wired network system.

Further yet, the architecture may function as a joint wireless and/or wired system. In such an embodiment, the network system may incorporate aspects of wired connections and wireless connections. For example, in one embodiment, one or more of the devices may be connected to a wired network system. Additionally, one or more other devices may be connected wirelessly to the same network system (e.g. through WiFi, Bluetooth, etc.). In other embodiments, the devices may create a mesh device-to-device wireless system (e.g. Bluetooth mesh networking system, etc.).

In some embodiments, when the devices are connected to, for example, a wireless network system, they may still have access to a cellular data connection. In other embodiments, the devices may lose a cellular data connection once they connect to a wireless network system. As such, to preserve the device's ability to utilize the cellular data connection, the devices may organize into a mesh topology (e.g. Bluetooth mesh network, etc.) where the master device can either connect individually to each slave device, or each slave device may simply connect to its nearest device neighbor and forward on requests and/or media content. In this manner, aspects of both a wired network topology, a wireless network topology, and a device-to-device network topology may be integrated into one cohesive network system.

In one embodiment, a cohesive network system may allow for higher overall bit rates (e.g. aggregate data connections, etc.), redundancy of requests (e.g. each request is sent through two devices to minimize dropped packets and/or lower quality, etc.), and/or any other network feature to effectively present the requested media content.

In another embodiment, the network system may be connected to a global network drive for use by each of the connected devices. For example, in one embodiment, the network system may include a network storage drive. Each device may have access to this drive, and when requests are sent by the master device to the individual slave devices, the requested content may be provided and sent directly to the central network drive. In some embodiments, the master device or the central device may function simultaneously as a network drive. However, in some embodiments, to minimize network bottlenecks (e.g. information and requests are all filtered through the master device, etc.), a separate network drive with its own network connectivity (e.g. wired, wireless, etc.) may be provided.

Figure 6:
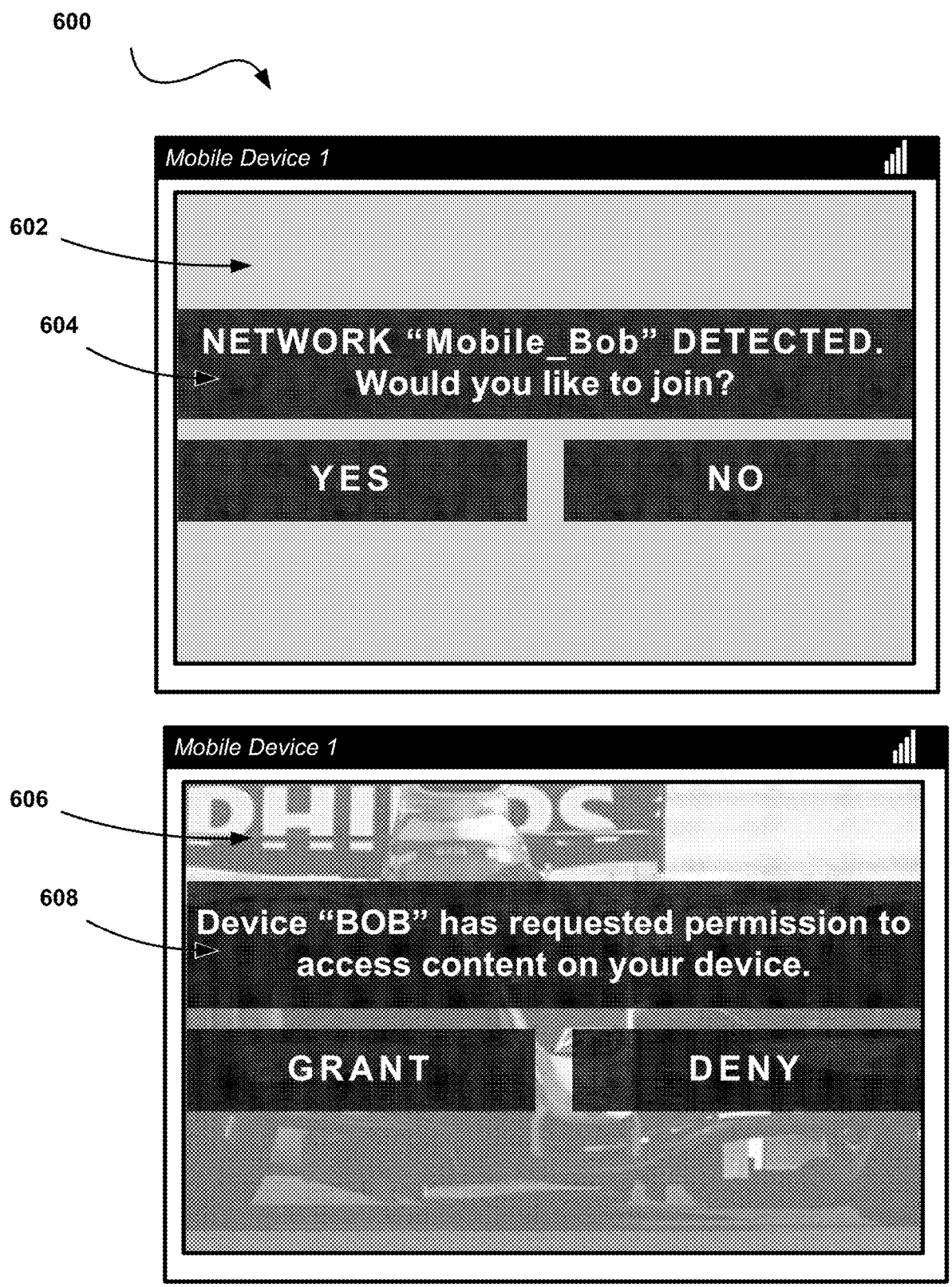
FIG. 6 shows a user interface for the distributing of media content, in accordance with one possible embodiment.

FIG. 6 shows a user interface 600 for the distributing of media content, in accordance with one possible embodiment. As an option, the user interface 600 may be implemented in the context of the details of any of the foregoing Figures. Of course, however, the method 600 may be carried out in any desired environment. Further, the aforementioned definitions may equally apply to the description below.

As shown, a user interface may include a display 602, and a prompt 604 to join a network. In one embodiment, the user interface may be automatically displayed on the device and/or display when the network is detected. For example, a mobile device may come within range of the network and thereby detect the network. In other embodiments, the device may not be capable of detecting a network until a network card (e.g. WiFi, WLAN, LAN, etc.) is activated. However, in some embodiments, the device may be capable of sensing one or more networks even when a network card is deactivated. For example, in one embodiment, the device may sense a network based off of a device-to-device request (e.g. ping request to join network, etc.).

Still yet, network activation may be based off of the context of the device. For example, in one embodiment, if it is sensed that the device is moving (e.g. at a threshold rate, etc.), then the device may recognize that it is traveling in a car and automatically activate the WiFi to interact with the car network system. Of course, in other embodiments, the user may join any network system manually if desired (e.g. configure settings to not take automatic actions, etc.). In some embodiments, the context (e.g. of determining whether to activate network connectivity, etc.) may be based on the time of day (e.g. night time, day time, etc.), location (e.g. GPS signal location, etc.), speed (e.g. >15 mph, etc.), message (e.g. text sent from central device to the device requesting the device to join the network, etc.), email message (e.g. email sent from central device to the device requesting the device to join the network, etc.), presence of other devices (e.g. device may recognize based on device id, user id what is near, etc.), altitude (e.g. 10,000 ft, etc.), acceleration (e.g. m/s^2, etc.), gyroscope, and/or any other sensor which may provide contextual information.

As shown, media content 606 may be displayed on the device. Additionally, a request 608 to access media content may be displayed.

In one embodiment, once a user has accepted to join a network system (e.g. wireless network, wired network, device-to-device integration, etc.), then the master device on the network system may request one or more permissions. For example, the master device may request permission to access to the media content on the device, to control the device's display, to access and/or use the device's data connection, to access the email and/or other messages on the device, to access and/or use one or more sensors on the device (e.g. accelerometer, etc.), to share information about the device (e.g. with others on the network, etc.), and/or any other permission which may influence interaction with the master device and any other device on the network system.

In some embodiments, the permissions granted to the master device (and/or any other device) may be temporary or permanent, as desired by the user. For example, in one embodiment, the user may desire to grant permanent access to the master device to access media content. However, the user may not grant permanent access to the master device to control the device display. In such an embodiment, therefore, the user may manually grant the master device access to control the device display as desired (e.g. change configuration in network settings, etc.). Or, in another embodiment, when streaming media content, the master device may request access to display the media content on the device, whereupon the user may grant temporary access for the master device to display media content on the device.

Of course, in various embodiments, the user may retain full control of permissions, control, access, and/or configuration of settings relating to the network system and/or any other device on the network system.

In one embodiment, any permission and/or setting set by the user may be saved for the next time the user and/or the device logs into the network system. In such an embodiment, the device may not need to grant permissions to the device and/or network system, as such requests will have been already granted or denied based off of prior selections.

In another embodiment, media content can be played on a user's device. The user may wish to share the content with other users on the network system and may send a request to the master device for distribution. The request may state "Device X requests to share "MEDIA CONTENT" with users of the network system." The master device may automatically grant or deny the request (e.g. based off of prior history, based off of predefined settings, etc.), or may require a user response before proceeding.

In a separate embodiment, the media content may be streamed from a user's device directly to another slave device. In some embodiments, streaming from one slave device to another slave device may require the first slave device requesting permission through the master device to stream to the slave device. In this manner, the master device may retain control of what is being displayed on each device. In another embodiment, however, the first slave device may have the ability to select which device it would like to stream to. In this embodiment, the user may select a second slave device, select to stream to the second slave device, and send the request directly to the second slave device. As such, depending on how the network system is configured, slave devices may communicate directly with each other, or may be required to go through the master device for communication.

Additionally, in one embodiment, if media content is being streamed from one device to another, the second device may merely see the media content as it is currently being displayed on the first device. In other embodiments, however, once a request to share media content has been sent and accepted, the second device may have control of the media content relative to the second device. For example, rather than merely watching the media content as controlled by the first device, the second device may wish to pause, stop, fast-forward, and/or take any other action to control the media content, without disrupting what is being displayed on the first device. In this embodiment, therefore, the first device is acting as a streaming server to the second device, where the second device has the ability to control in some part the presentation of the media content on the second device.

In one embodiment, the user interface may be displayed on a mobile device (e.g. phone, tablet, etc.), or on a fixed device (e.g. mounted device, etc.). Integration with other devices may occur through the network system. In various embodiments, the network system may be located in a car, on a bus, in an airplane, in a movie theater, in a classroom, on a street, and/or any other locations where devices may interact in some manner.

As an example, an airplane typically has many types of devices already present in the aircraft. In one embodiment, the devices may all be under the control and/or direction of a master device. However, passengers frequently bring one or more devices with them on the aircraft. In such an embodiment, each individual device may communicate with a seat display to integrate content associated with the user. For example, the user's personal devices may include movies, music, books, and/or any other media content. The seat where the user is located may include a display, a game console, and/or any other interactive elements. In this embodiment, a separate network system may be established between the user's personal devices and the resources located at the seat. In this manner, the user can use the larger screen associated with the seat for the purpose of viewing media stored on one or more personal devices.

In one embodiment, an airline may have a central device used for managing and/or distributing media content. For example, in one embodiment, each passenger may have their own device, but resources (e.g. access to a network connection, access to videos/movies, etc.) on the airline may be granted to each individual passenger. Additionally, in one embodiment, if individual devices have permission to share resources (e.g. network connection, access to videos/movies, etc.), such resources may be potentially shared with the central device and/or other devices associated with individuals.

In another embodiment, one or more network systems can be created between multiple users and/or groups. In this embodiment, resources from one user and/or group may be shared with one or more other individuals and/or groups. For example, in one embodiment, a first user may have downloaded on a personal tablet mobile device a gaming application. Using the controls and display associated with the seat, the user may access the gaming application on the tablet device via the media device associated with the seat. In a further embodiment, the user may share the gaming application to be played amongst more than one individual. In this embodiment, therefore, the tablet may stream the gaming content (e.g. including sending out graphical information and receiving commands from each user, etc.) such that each individual user may interact with their individual seat display device and access gaming resources associated with the user's personal tablet. As such, a gaming application originally stored and used on just one tablet may be accessed via a second device (e.g. associated with the seat, etc.), and further accessed and/or shared with other individuals, their personal devices, as well as devices associated with their seat.

Still yet, in another embodiment, the media content to be distributed may be simply what is being displayed on a device (e.g. a screenshare functionality, etc.). In this embodiment, the screen of one or more devices may be shared simultaneously. For example, in one embodiment, a master device may be giving a presentation. During the presentation, one or more slave devices may have other information which is relevant to the presentation which may be displayed simultaneously with the presentation from the master device. In various embodiments, the additional screens may be displayed as popup windows, an overlay on top of the main page, a side-by-side configuration, or any other configuration where one or more screens may be displayed simultaneously.

In another embodiment, one or more screens may be selected to be viewed. For example, a user may be watching a movie on a tablet computer. A request to join a game based on another user's tablet may be received and accepted. While still watching the video, the user may display next to the video a game associated with the tablet hosting the game.

In this manner, the user may still watch the video but interact with another user/tablet at the same time.

Further still, in one embodiment, multiple screenshares may be simultaneously broadcasted. For example, in one embodiment, a device on the network system may browse through one or more available screenshares to select which one should be viewed. In this embodiment, the available screenshares may function, therefore, as available channels to be viewed on the network system, where each channel displays media content or the screen of the associated device. The user of the device may decide which channel to be selected and viewed.

Figure 7:
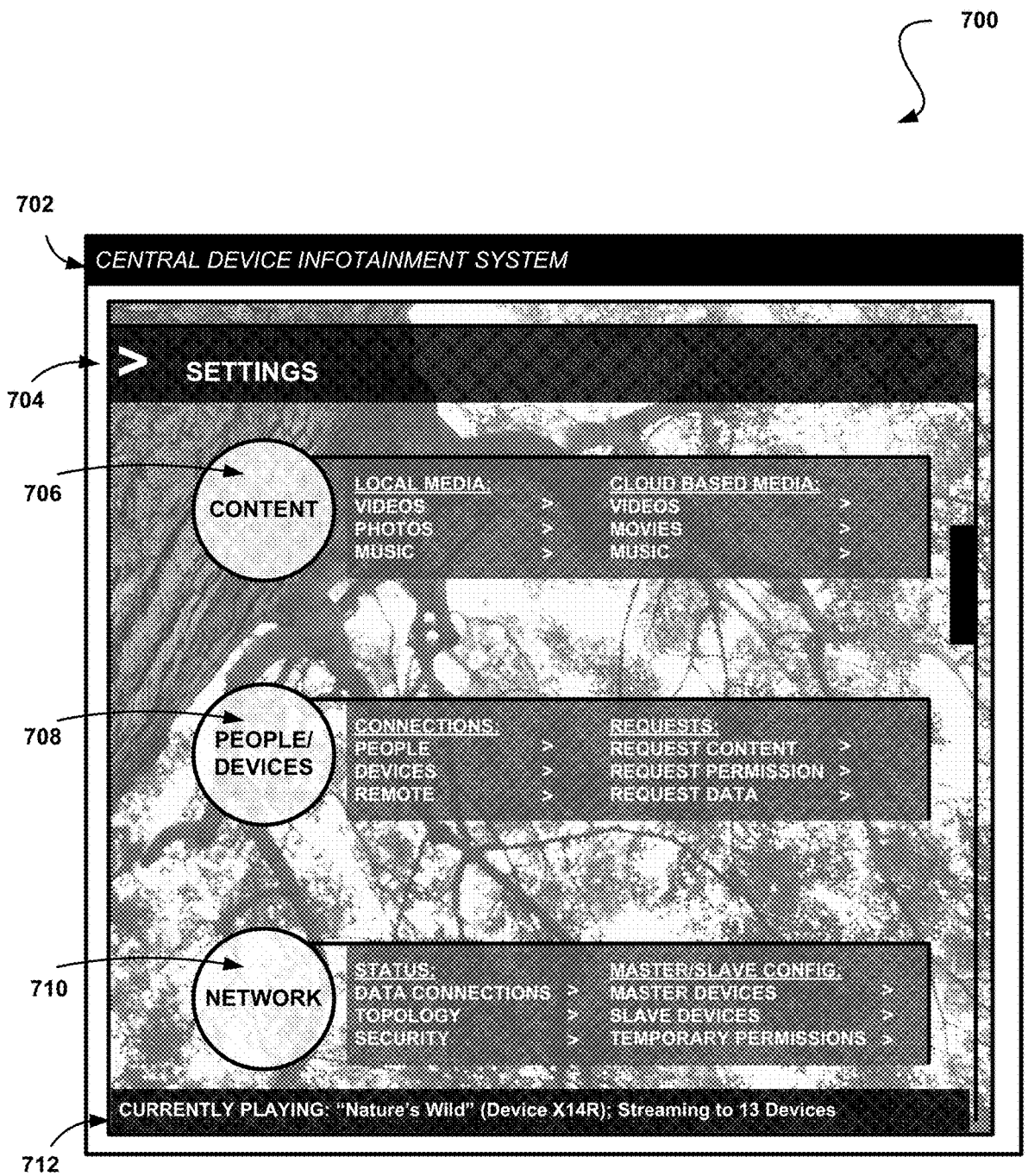
FIG. 7 shows a user interface for the distributing and directing of media content, in accordance with one possible embodiment.

FIG. 7 shows a user interface 700 for the distributing and directing of media content, in accordance with one embodiment. As an option, the user interface 700 may be implemented in the context of the details of any of the foregoing Figures. Of course, however, the user interface 700 may be carried out in any desired environment. Further, the aforementioned definitions may equally apply to the description below.

As shown, the user interface 700 may include a title bar 702, a settings menu 704, a content submenu 706, a people/devices submenu 708, a network submenu 710, and a current status bar 712. In various embodiments, the user interface may have more or less than that which is displayed. For example, in other embodiments, the user interface may include submenus relating to content optimization (e.g. preferred display size, output sizes, etc.), remote configuration (e.g. ability for remote devices to control the central device, etc.), parental settings (e.g. restrict what children are able to do on the network, etc.), administrator settings (e.g. restrict what any entity is able to do on the network, etc.), one or more video content applications (e.g. Netflix, Amazon Prime, Hulu, etc.), one or more music content applications (e.g. Pandora, Spotify, Google Music, etc.), one or more photo content applications (e.g. Flickr, Instagram, etc.), one or more social media content applications (e.g. Facebook, Twitter, etc.), one or more gaming content applications (e.g. Angry Birds, Scrabble, etc.), any other application which may be loaded onto a media content device, and/or any other feature which may relate in some manner to the central device.

In one embodiment, the central device may function as a first master device. For example, in the absence of any other master device, the central device may automatically assume the task of managing devices, directing and distributing media content, as well as managing anything relating to the network system. In another embodiment, the central device may function as the first master device, even if other master devices are added to the network system. For example, in one embodiment, other master devices may have the ability to control the distribution and directing of media (e.g. control what is being displayed and where it is displayed, etc.), but the central device may be the central hub from which the content is actually streamed to all other devices on the network system. The central device, therefore, may receive commands from other master devices to retrieve content (or send requests to slave device to stream content to the central device or to any other device) and stream the retrieved content.

In another embodiment, other master devices may have increased permissions allowing the device to control the media content being viewed. However, the central device may remain as the first master device which actually distributes the media content, per the input from other master devices. Of course, the central device may be configured in any manner to work with other master or slave devices.

Further yet, permissions relating to any of the master and/or slave devices, or the central device, may be allocated as desired by the user. In some embodiments, the network system may not have a central device. In such an embodiment, a master device may function as a central device for the network system and direct and distribute media content accordingly.

In one embodiment, the settings menu may be displayed by selecting a settings button associated with a built-in infotainment system, giving a voice command (e.g. "display settings," etc.), selecting a settings touch icon, and/or any other representation and/or command which may cause the settings menu to be displayed. In some embodiments, the settings menu may be disabled on display devices while media content is being presented. In other embodiments, the type of device (e.g. master, slave, etc.) may determine whether the settings menu is disabled.

In various embodiments, the content submenu may relate to content media available on the network system. For example, in one embodiment, as devices are connected to the network system, a master device or central device may scan the new device to determine what media content is found on the device. If content is found, the master device or central device may request permission to share the media content with other devices located on the network system. In other embodiments, a single overall permission may be given by the device at the time of logging into the network system to the master device or central device, relating to scanning for, retrieving, and distributing media content. Further still, in other embodiments, the permissions may relate to features beyond content available on the device, including data connections, battery status, user identifications, message retrieval and scans, text messaging, and/or any other feature associated with the device.

In some embodiments, the content submenu may relate to local media and/or cloud-based media, if available. For example, in one embodiment, the network system may be located in an area without a data connection, in which case the cloud-based media option would not be available and/or displayed. In other embodiments, a distinction between local media and/or cloud-based media may not be displayed, and only available media content (regardless of whether it is local or cloud-based) may be displayed.

In various embodiments, the local media may include any media content on the network system. For example, videos, photos, music, games, screencasts, and/or any other content which may be streamed and/or sent to another device. In one embodiment, resources of a device may be construed as media content. For example, a camera located on a device may be used as a network media content resource. Of course, any feature on a network system device may be used (if permissions are granted) by other devices in the network system.

In some embodiments, the navigation of the settings menu and/or any submenu may occur through a touch interface, by a voice command (e.g. "navigate to content submenu," "select local media," etc.), by a physical button (e.g. integrated into an infotainment car system, integrated into a classroom media system, etc.), by a remote control, and/or any other device which may send a command to the settings menu.

In one embodiment, the people/device subfolder may display connections of devices and/or people on the network system. For example, in one embodiment, where information about the user using the device is known (e.g. user id, etc.), the user identification may be used rather than a device identification. Of course, the master device may configure in any manner how the devices and/or people are displayed.

In some embodiments, the device identification may not have a user and/or person associated with the device. For example, in one embodiment, one or more displays may be on the network system but may not be associated directly with a user and/or person. As such, the network system may include devices which may be associated with a user, or may not be.

Still yet, in one embodiment, one or more remote connections associated with the network system may be displayed. For example, in one embodiment, a remote connection may include a connection to a master device which is located remotely (e.g. geographically separated, geographically out of range, etc.) from the network system. In other embodiments, any device that is connected into the network system via the internet may be considered a remote connection. In various embodiments, a network system may configure remote connections in any manner, including, for example, preventing remote connections, limiting remote connections to master devices, including slave devices as remote connections (e.g. so that media content may be accessed even when the device is not present, etc.), and/or configuring the remote connection in any manner.

In one embodiment, the people/device submenu may include requests. For example, the central device or master device may send out a global requests (e.g. to all devices on the network system, etc.) requesting permission to access media content. In another embodiment, a request may be sent by the central device or master device to a particular device.

In some embodiments, the request may be sent from the central device or master device to one or more devices located on the network system. In other embodiments, the request may be sent from one or more devices located on the network system to the central device or master device. For example, in one embodiment, a device may wish to share and display on other devices a presentation, a video, and/or any other media content. The request may be sent to the master device or central device which may then approve the request and manage the distribution of the media content (e.g. retrieve the media content and stream to other devices, direct the device to stream the content to other devices, etc.). In other embodiments, the request may be received from a remote connection (e.g. to display media content, etc.).

In one embodiment, receiving a request to a master device or central device may require user input, or may be determined automatically. For example, in one embodiment, an interface may be displayed, notifying the master device or central device of the request, with the ability to "grant" or "deny" the request. In other embodiments, the determination may occur automatically based on one or more rules. For example, in one embodiment, it may be determined that the request is coming from a device to which permission to display media content had been granted at least once in the past. Based off of prior interaction, therefore, the master device or central device may automatically grant permission. In another embodiment, if a device had been denied permission at least once, then the master device or central device may deny permission for the device to display media content. In other embodiments, the rules may be based off of the user controlling the device (e.g. user id, etc.), prior interaction with the network system, an amount of time a device has been connected to the network system, a number of times a device has connected to the network system, a position (e.g. manager, administrator, etc.), metadata associated with the media content (e.g. creator, etc.), and/or any other information associated with the content media or device or user which may be used to grant or deny permission.

In another embodiment, if user input is not received within a set time period (e.g. 30 seconds, etc.), then the request may be automatically denied or granted, consistent with the foregoing paragraph. Additionally, in another embodiment, if user input is not received within a set time period, then the request may be placed in a queue of pending requests associated with the master device or central device.

In one embodiment, the network submenu may display active device connections, cellular data connections (e.g. aggregate connection, individual device data connection, etc.), a topology of devices (e.g. location of where devices are connected, etc.), a security of the network system (e.g. permissions, passwords, firewall configuration, etc.), configuration settings relating to master and/or slave devices (e.g. devices which have been granted master configuration, permissions relating to each device, temporary master setting, pending master requests, etc.), as well as any other setting which may relate in some manner to the network of the network system.

In one embodiment, the network system may permit two or more active connections per device at the same time. For example, in some embodiments, a slave device may be connected to the network system wirelessly (e.g. WiFi, etc.), and may be simultaneously connected to a cellular data connection. Additionally, in other embodiments, the device may also be connected to other network connections and/or device-to-device connections (e.g. Bluetooth, etc.). In some embodiments, in order to establish two or more active network connections, a network bridge may be established on the device.

In one embodiment, the current status bar may display what is being played and/or displayed to all devices on the network system. In other embodiments, the status bar may indicate what media content is being viewed on each device. Further still, in one embodiment, the status bar may indicate what devices are receiving one or more streaming media content from the master device or central device.

Figure 8:
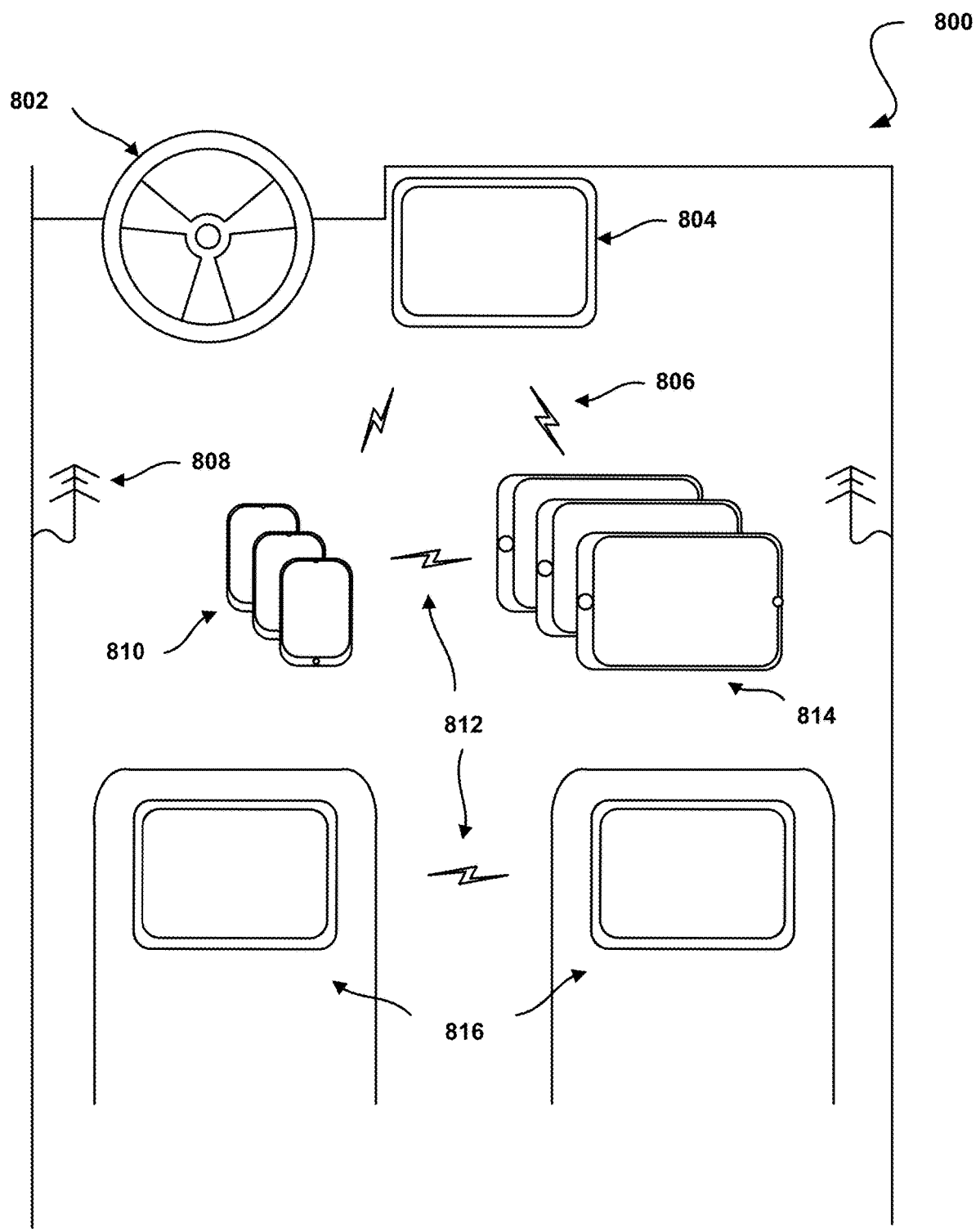
FIG. 8 illustrates a vehicle communication system for distributing and directing of media content, in accordance with one possible embodiment.

FIG. 8 illustrates a vehicle communication system 800 for distributing and directing of media content, in accordance with one embodiment. As an option, the system 800 may be implemented in the context of the details of any of the foregoing Figures. Of course, however, the system 800 may be carried out in any desired environment. Further, the aforementioned definitions may equally apply to the description below.

As shown, the system 800 may include steering wheel apparatus 802, an infotainment center device 804, wireless communication 806, repeaters 808, mobile phone devices 810, device to device communication 812, tablet devices 814, and in-seat devices 816.

In one embodiment, the steering wheel apparatus may include the ability to control an infotainment system, one or more mobile devices (e.g. mobile phones, tablets, computers, etc.), and/or any other device associated with the vehicle. For example, in some embodiments, the steering wheel apparatus may include the ability to raise and/or lower the volume, change the music, change the designation of the controlling master device, select which media content to display, select which media content to distribute, approve one or more new devices, approve and/or deny requests from one or more of the connected devices, and/or take any other action relating to the vehicle and media content.

In various embodiments, the infotainment center device may function as a central device and/or a master device. In other embodiments, the infotainment center device may be permanently integrated into the structure of the vehicle. In other embodiments, the infotainment center device may be mobile but must be kept within certain geographic bounds of the vehicle (e.g. within 2 feet of the perimeter of the vehicle, etc.).

In another embodiment, the infotainment center device may be in wireless communication with one or more devices (e.g. mobile phone devices, tablet devices, in-seat devices, etc.). In other embodiments, the communication between the infotainment center device and any device may occur through a wired connection (e.g. dock connector, Ethernet, system connector, etc.).

In one embodiment, the communication between the infotainment center device and any device may occur by any communication technology (e.g. IP, USB, Bluetooth, Wi-Fi, Wi-Fi Direct, Real-Time Protocol, Universal Plug and Play, etc.). Additionally, in other embodiments, the communication may include a standard by which the devices may communicate (e.g. Mirrorlink, etc.). Of course, however, any standard and/or technology may be used to connect the devices (e.g. infotainment center device, mobile phone devices, tablet devices, in-seat devices, and/or any other device in the vehicle, etc.).

In another embodiment, the communication may allow the display and/or media content found on any of the devices to be controlled by a master device (e.g. central device, infotainment center device, etc.). In other embodiments, any of the devices (if permissions are granted by a master device) may control at least part of the functionality associated with the infotainment center device (e.g. raise/lower volume, change channel, change media content, accept/deny new devices and/or requests, etc.). Further still, any of the devices (if permissions are granted by a master device) may control at least part of the functionality associated with the vehicle (e.g. raise/lower air temperature, raise/dim lights, redirect air flow, open sunroof, raise/lower windows, etc.).

In one embodiment, the repeaters may be used to extend the range of the wireless communication. However, in some embodiments, the signal may be sufficiently strong by a device and/or wireless transmitter to not need a repeater. Nonetheless, in one embodiment, the repeaters may be used to communicate with other vehicles and/or data sources. For example, in one embodiment, the repeaters may be used to establish a mesh-network with other vehicles, login to temporarily available WiFi networks, be used to establish and/or communicate with satellites (e.g. for data transmission, etc.), and/or enhance the vehicle network system in any manner.

Further, in another embodiment, the in-seat devices may be mobile (e.g. removable from the seat, etc.) or permanent (e.g. built into the seat system, etc.) devices. In other embodiments, the in-seat system may include a dock into which a mobile device (e.g. phone, tablet, etc.) may be inserted. In some embodiments, the in-seat system may provide charging functionality, network connectivity (e.g. wired connection and/or wireless connection, etc.), and/or provide any functionality to other devices to connect to the vehicle network system.

Figure 9:
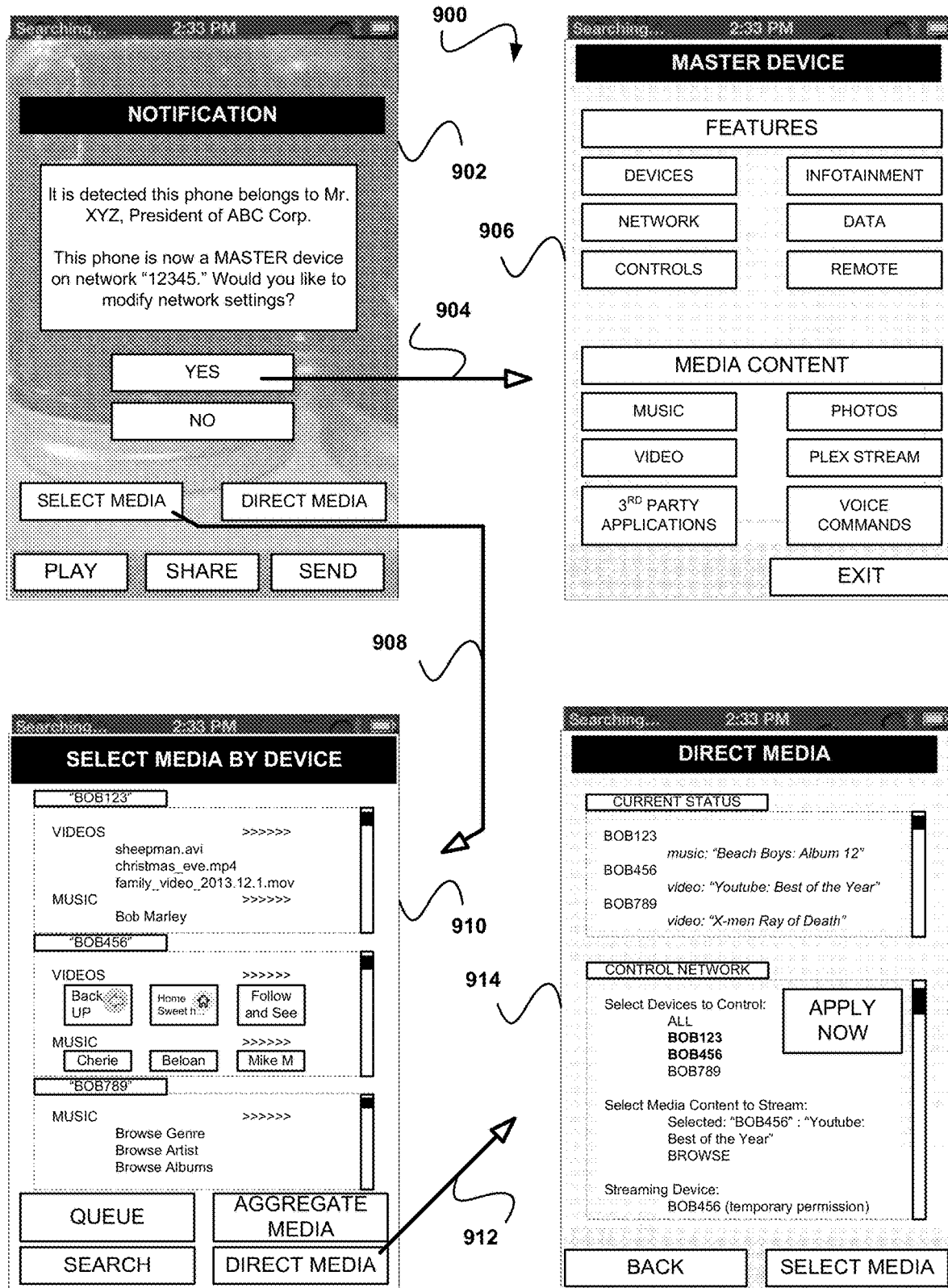
FIG. 9 shows a user interface for distributing and directing media content, in accordance with one possible embodiment.

FIG. 9 shows a user interfaces 900 for distributing and directing of media content, in accordance with one embodiment. As an option, the user interfaces 900 may be implemented in the context of the details of any of the foregoing Figures. Of course, however, the user interfaces 900 may be carried out in any desired environment. Further, the aforementioned definitions may equally apply to the description below.

As shown, a notification user interface 902 may be displayed. In one embodiment, the notification user interface may include a notification of a network status (e.g. connected/denied, etc.), a permission level (e.g. master/slave, etc.), a request response (e.g. request for media is granted/denied, etc.), and/or any other notification which may relate in some manner to the network system.

In one embodiment, the notification may be displayed only for the first time the device is initially connected to the network system. In such an embodiment, the notification may be disabled for any future connection, and may automatically connect to the network using previously configured settings.

In another embodiment, the notification may reflect an exchange between the device and the networks system. For example, in one embodiment, the device may send credentials (e.g. user id, device id, etc.) to the network system. The network system may recognize the credentials (e.g. based off of database list, etc.), or may recognize metadata associated with the credentials or the device (e.g. group role, user position, etc.). Based off of such interaction, and exchange of information, the device may display a notification informing the user of the results of the exchange. For example, in one embodiment, the notification might read, "It is detected this phone belongs to Mr. XYZ, President of ABC Corp. This phone is now a MASTER device on network "12345." Would you like to modify network settings?" In this embodiment, therefore, the notification notifies the user of the device the results of the exchange (e.g. credentials passed to the central network system device and a set of permissions granted, etc.). Of course, in other embodiments, the notification may include any language based off of the exchange.

In other embodiments, the notification user interface may include the ability to "select media" and/or "direct media." Further still, in one embodiment, the notification may be an overlay pane on the device, and below the overlay pane may be one or more buttons relating to the media content being displayed and/or played. For example, in one embodiment, the one or more buttons may include the ability to play, share, and/or send the media content. In some embodiments, such buttons may depend on whether the device is connected to a network system. For example, if the device is not connected to a network system (e.g. for sharing, etc.), the "share" function may be grayed out and may not be selected. However, in other embodiments, if the device is connected to a network system, then the option to share the media content may be displayed.

In some embodiments, selecting to share the media content may cause a separate interface to be displayed. For example, in one embodiment, the interface may include a request to share with a specific device, to a group of devices, and/or to the entire network. In some embodiments, the request may be sent directly to the requested device. In other embodiments, the request may be sent to a pre-designated master device (e.g. central device of the network system, etc.) which manages all requests from the devices. Of course, the interface may be configured in any manner to facilitate the sharing of the media content.

As shown, a button 904 to modify networks settings may be selected, and in response, a master device interface 906 may be displayed. In some embodiments, the master device interface may differ, based on the level of permissions associated with the device. For example, in one embodiment, a central master device may have the ability to control and/or manage all devices on the network system. Whereas, in another embodiment, a regular master device on the system may have the ability to control media content and not necessarily manage devices on the network system.

In one embodiment, the master interface may include one or more features, including the ability to select details relating to devices, control network settings, select controls (e.g. shortcuts on the devices, shortcuts on the steering wheel assembly, etc.), integrate with the infotainment system and/or interact with a central device, receive information relating to data (e.g. how much data has been used by the network system, etc.) and/or select one or more available data streams (e.g. associated with individual devices, etc.), control remote settings for remote devices, and/or control any other feature associated with the network system.

In another embodiment, the master interface may include settings relating to media content. For example, in various embodiments, a music, video, and/or photo setting may allow the user to select which devices can be used for content retrieval, a type of genre available to be streamed (e.g. hip-hop music, adventure movies, nature photos, etc.), a time period to limit the number of files (e.g. movies before 1950, photos taken after year 2012, etc.), specific content files which may or may not be used by the network system (e.g. parental controls, etc.), and/or any other setting relating to music, video, and/or photo. In another embodiment, settings relating to $3^{rd}$ party applications may include whether other devices can use $3^{rd}$ party applications of another device (e.g. although it may depend on the license associated with the $3^{rd}$ party application associated with the host device, etc.), integration settings relating to multiple devices (e.g. each device may have the same app installed and the master controls allows for how the devices interact, etc.), and/or any other setting relating to $3^{rd}$ party applications.

Still yet, in one embodiment, the media content may be related to a media server (e.g. PLEX, etc.). In such an embodiment, the master device may control how content is retrieved from the media server. For example, in one embodiment, the media server may be located remotely from the network system. As such, settings may relate to the quality of content media delivered to the network system, whether cellular data can be used to retrieve content media, the size of the displays on the network system (e.g. if not automatically detected, etc.), designate a specific display(s) to stream to (e.g. default settings, etc.), configure audio to be sent to the vehicular assembly, select whether subtitles are to be displayed, select preferred language to be used, select when to update the database and refresh the library, and/or any other setting which may relate to a media server.

In some embodiments, the media server may be located locally on the network system. In other embodiments, the media server may be located remotely to the network system, and data may be fetched using any available network communication (e.g. WiFi, cellular data, etc.).

Further still, in one embodiment, the user may select one or more voice commands to be associated with the device. In one embodiment, the voice commands may be associated with any master device. Or, in other embodiments, the voice commands may be associated with just one device, or with one central device. In one embodiment, even if the voice commands are associated with just one device, the voice input may be retrieved from a device that has an available microphone. For example, in one embodiment, the central device may be the only device capable of receiving voice commands to control the network system. A voice command may be given indicating "Play Bob Marley," may be received by a slave device, and the input may be sent to the central device for processing and potentially for fulfilling.

In one embodiment, verification and/or security may be associated with the voice commands. For example, the device with voice command permission may have a button to commence the voice command. In other embodiments, the voice command may be associated with a particular voice, and only inputs from that voice will be processed and fulfilled.

As shown, a button to select media 908 may be selected, and a select media by device interface 910 may be displayed. In one embodiment, the devices connected to the network system may be displayed. In another embodiment, a list of pending requests of devices to join the network system may be displayed, as well as a list of rejected devices denied access to the network system.

In various embodiments, the devices may display content in any manner. For example, in one embodiment, the content may be displayed by name, by a graphic (e.g. icon, etc.), by a grouping (e.g. genres, artist, albums, year, etc.), or in any other manner. In some embodiments, the interface displayed may be dependent on the type of device. For example, in one embodiment, the device may include a touch-screen, and so the interface may be touch-optimized to receive inputs from a finger, stylus, and/or any other input mechanism. In another embodiment, the device may not be a touch-screen, and may rely upon integration of a mouse, in which case the text and/or graphics may be displayed in a smaller manner. Of course, the manner in which the media content is displayed by device may be altered in any manner by the user.

In one embodiment, rather than divide the media content by device, all of the media content may be aggregated together, permitting the user of the device to browse and/or search through all connected devices simultaneously.

In another embodiment, a search function may be permitted whereby media content available on any device connected to the network system may be searched and/or displayed in the results. In various embodiments, the search function may search media content stored locally on the devices connected to the network system, stored remotely on a cloud-based system, and/or stored in any other location.

In one embodiment, a queue of media content may be displayed. For example, in one embodiment, the queue may contain media content placed therein by a master device (e.g. or a device with master permissions, etc.), by a device requesting content to be played (e.g. from a slave device, requires approval by a master device, etc.), may display related media content to the currently being played media content (e.g. similarity lists, video playlist, music playlist, etc.), and/or may be created and/or edited by any other device and/or user.

In some embodiments, the queue may be associated with one or more online accounts. For example, in one embodiment, the queue may be associated with an online music service (e.g. Pandora, Spotify, Google Music, etc.), online video service (e.g. Youtube, Vimeo, etc.), online media server (e.g. PLEX, etc.), and/or any other online service. In such an embodiment, the queue may be populated with one or more media content from one or more online services. In other embodiments, the queue may be populated by media content stored locally (e.g. on devices in the network system, etc.), in combination with, or not including, the online services.

In one embodiment, the queue may be managed by a master device. In other embodiments, any of the slave devices may submit requests to add to and/or reorganize the content in the queue. In another embodiment, the slave device may have extended permissions to modify the queue in some manner (e.g. add to, delete entries, etc.). Further yet, in one embodiment, if a device is a guest on the network system, the device may have access to view the queue. In other embodiments, the guest device may have permission to add to and/or modify the queue in some manner.

As shown, a button to direct media 912 may be selected, and a direct media interface 914 may be displayed. In one embodiment, the direct media interface may display a current status of all devices on the network system and the media content being displayed on each device. In one embodiment, the current status pane may include showing a thumbnail image of the display of each of the devices.

In another embodiment, if a device is not currently viewing a media content, the current status pane may list the device as having "no media content currently being displayed." Of course, in another embodiment, any designation may be displayed. Additionally, if a user is using more than one media content (e.g. listening to music and playing an interactive game, etc.), the direct media interface may list all associated media content files currently being displayed and/or used on the device.

In another embodiment, a master device may select how to direct media content. For example, in one embodiment, a master device may select which devices (or displays) to control the display, the media content which is desired to be streamed, the streaming device (e.g. master device, slave device, etc.) used to broadcast the media content, and/or any other information which may influence how the media content is sent to displayed on other devices.

Still yet, in one embodiment, a master device may direct media by first selecting a media content (e.g. available on the network system, etc.), and then selecting to direct the media content, after which a direct media interface may be displayed to complete the directing of the media content to all devices.

In another embodiment, a user may be viewing a media content on a slave device and a master device may select the media content being viewed by the user on the slave device, and select to direct it also to all other devices. In this embodiment, the direct media interface may be automatically populated based off of information of where the media content is being played (e.g. source of the file, source of the streaming device, etc.). Additionally, in other embodiments, shortcuts for directing the media content to all or some of the devices on the network system may be preconfigured to facilitate the directing of media content.

Figure 10:
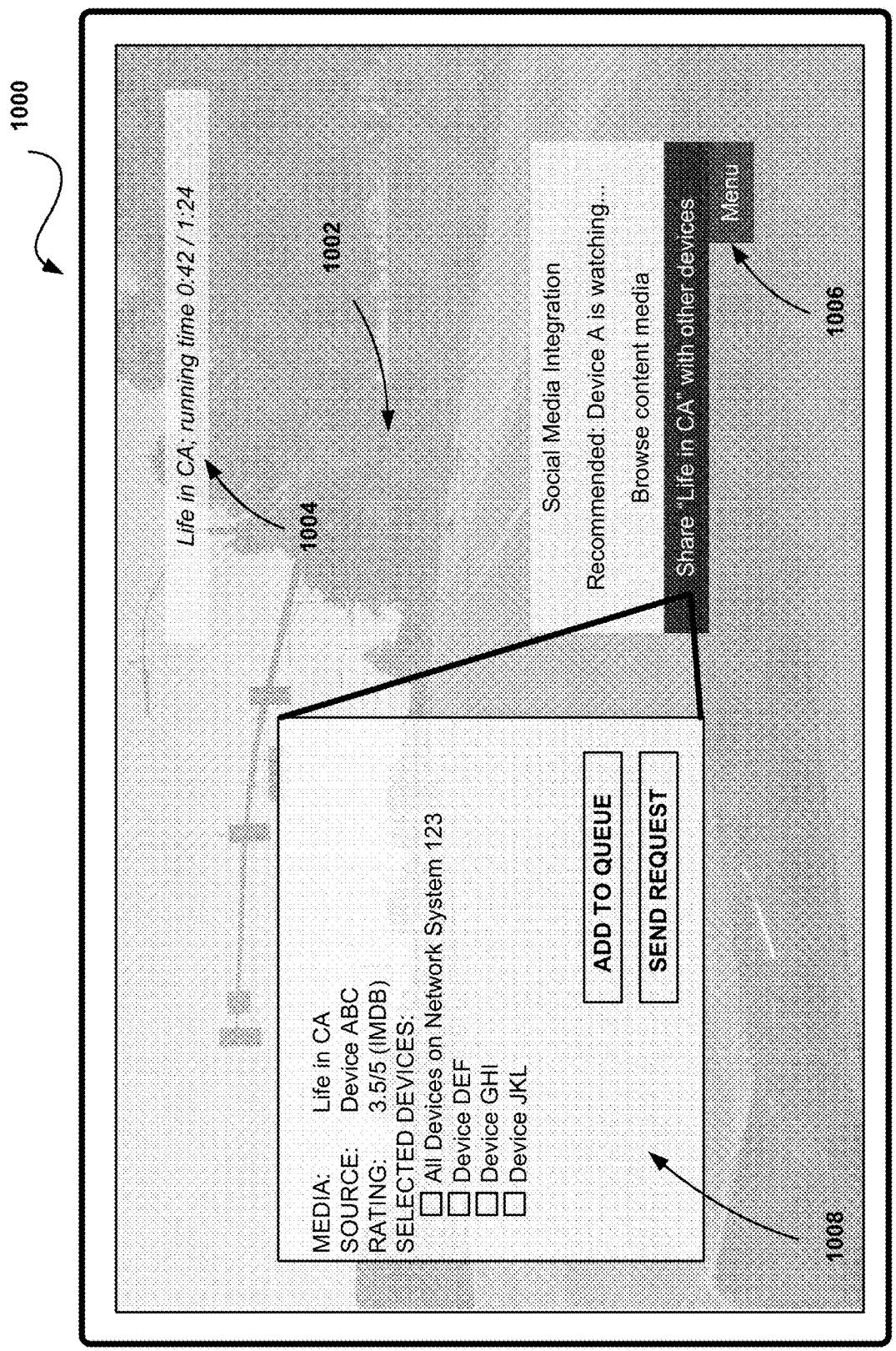
FIG. 10 shows a user interface for distributing and directing media content, in accordance with one possible embodiment.

FIG. 10 shows a user interface 1000 for distributing and directing media content, in accordance with one embodiment. As an option, the user interface 1000 may be implemented in the context of the details of any of the foregoing Figures. Of course, however, the user interface 1000 may be carried out in any desired environment. Further, the aforementioned definitions may equally apply to the description below.

As shown, the user interface 1000 may include media content 1002 being displayed. In various embodiments, the media content may include any type of content, including pictures, videos, music, presentations (e.g. powerpoint, etc.), web content, websites, documents, and/or any other content which may be displayed on the device and/or played by the device. The media content being displayed may include a current status bar 1004 which may show that which is currently being displayed.

In one embodiment, the current status bar may display information relating to that which is being displayed, including, for example, the title of the media content (e.g. file name, etc.), the running time if applicable (e.g. how many minutes shown, how many minutes left to go, etc.), notable people in the media content (e.g. singer, actor/actress, etc.), the source of the media content (e.g. which device it is being streamed from, etc.), and/or any other information relating to the media content. In another embodiment, controls for controlling the media content may also be displayed, including the ability to pause, play, stop, fast-forward, skip, go to the next content (e.g. slide, music, photo, etc.), and/or any other feature which may facilitate the controlling of the media content.

As shown, a menu 1006 may be displayed giving further options associated with the media content. For example, in various embodiments, the menu may provide social media integration, a recommended action, the ability to browse content media, the ability to share the media content with other devices, a settings option relating to the program and/or the media content, and/or any other option which may be associated with the media content.

In one embodiment, social media integration may include posting an update to a social networking website of what is being viewed (e.g. "watching "Life in CA" with users X, Y, and Z, etc.). In one embodiment, contextual information (e.g. who is viewing the media content, etc.) may be based off of nearby detected devices, a listing by the master device of all registered devices, and/or any other source from which all of the devices and/or users can be determined. In another embodiment, social media integration may facilitate the viewing of other media content. For example, in one embodiment, a social media notification may indicate that user 132 is watching a video. The user may select to watch the same video as user 132, which may further be streamed from the device to other devices on the network system. Therefore, in various embodiments, social networking integration may facilitate the viewing of media content.

In one embodiment, a recommended action may be based off of a history of actions. For example, in one embodiment, a user may be very interested in seeing any photo including a picture of a dog. If a photo of a dog becomes available (e.g. on the network system, etc.), a recommended link to the photo may be displayed. In one embodiment, only the most recent recommendation may be displayed. In other embodiments, more than one recommendation may be displayed, depending on the amount of space available for displaying information.

As shown, selecting the "Share "Life in CA" with other devices" link may cause a details pane 1008 to be displayed. In one embodiment, the details pane may include media content information (e.g. title, running time, etc.), a source of the media content (e.g. stored on the device, stored in the cloud, publicly accessible, etc.), a rating (e.g. IMDB rating, social media rating, etc.), the ability to select one or more devices to which the media content will be sent, the option to add the media content to a queue of one or more devices, the option to send the request to play the media content on one or more devices, and/or any other options which may relate to sharing a media content.

In one embodiment, a slave device may initiate the sharing of media content, after which the request is sent to a master device for distribution and directing. In other embodiments, the slave devices on the network system may be permitted to select devices to which media content should be sent. Further still, in various embodiments, sending and receiving media content may be predicated on preconfigured settings. In other embodiments, if settings are not preconfigured, they may be configured as needed when sending or receiving for the first time media content.

In another embodiment, a master device may direct media content to a slave device, and the media content may begin to be played on the slave device. In one embodiment, a user of the slave device may select to disable control of the master device, and resume control of the device (e.g. play any media content desired, etc.). In another embodiment, however, the master device may control the device completely such that the user cannot otherwise use the device until the master device has relinquished control of it.

Figure 11:
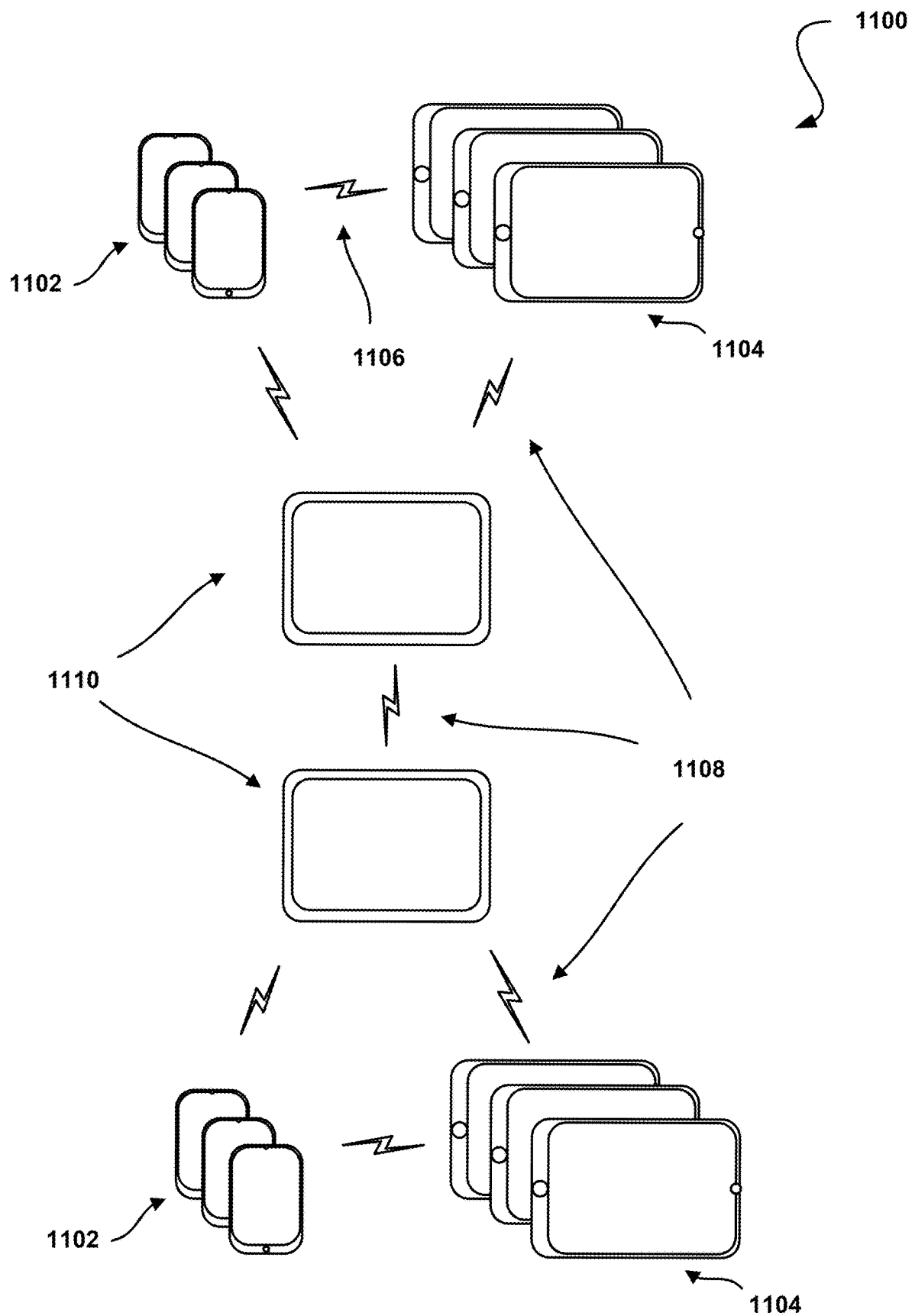
FIG. 11 shows a system for distributing and directing media content, in accordance with one possible embodiment.

FIG. 11 shows a system 1100 for distributing and directing media content, in accordance with one embodiment. As an option, the system 1100 may be implemented in the context of the details of any of the foregoing Figures. Of course, however, the system 1100 may be carried out in any desired environment. Further, the aforementioned definitions may equally apply to the description below.

As shown, the system 1100 may include one or more mobile phone devices 1102 and one or more mobile tablet devices 1104. Additionally, the one or more mobile phone devices and the one or more mobile tablet devices may communicate device-to-device wirelessly 1106. In other embodiments, the communication between devices may occur through a wired connection.

Further, as shown, one or more master devices 1110 may be included, and wireless communication 1108 may occur between the master devices and/or between the master device and one or more mobile phone devices and/or mobile tablet devices. In various embodiments, the one or more master devices may include one or more central devices.

In various embodiments, the master device may direct media content to another mater device and/or any slave device. For example, in one embodiment, the transmitting of media streams may include one or more media streams, including, for example, an audio component stream, a visual component stream, and/or a further real time live update data stream. Additionally, in other embodiments, multiple streams of media content may occur simultaneously.

As an example, in one embodiment, a slave device may push the audio relating to an audio book to the front speaker system of the car audio. In such an embodiment, a separate slave device may push a video which is distributed by a master device to all displays on the networks system, and the audio component is directed back to the car audio system but is played on the back speaker system. In this manner, therefore, multiple inputs and/or streams may be distributed in a network system. Of course, in another embodiment, a first audio stream (e.g. associated with an audio book from a slave device, etc.) may be directed to a car system headphone system, and a second audio stream (e.g. associated with a video from a slave device, etc.) may be directed to a car system audio speaker system. In other embodiments, the transmission of audio streams and/or video streams may be altered and/or configured by the user in any manner.

In a separate embodiment, therefore, audio and video stream information may be split into additional streams as necessary. In other embodiments, the audio and video content may be kept as one stream. Further yet, a master device may keep the audio and video streams as one incoming stream, but output the audio and video stream in more than one stream.

As an example, in one embodiment, a slave device may stream to a master device a video file. The master device may forward the streaming to one or more devices in the network system, wherein the forwarding includes both the video and audio component of the media content. In a separate embodiment, the master device may play the media content, and direct the video and/or audio components separately. For example, a first audio channel may be in a first language, a second audio channel in a second language, etc. and the master device may send out all such channels to all devices. In one embodiment, the devices may automatically determine (e.g. based on preferences, etc.) which audio channel should be played. In another embodiment, the master device may select which audio channel should be sent to specific devices. Further yet, in another embodiment, the master device may stream multiple video channels, each of which may be associated, for example, with separate subtitles. Like the audio channels, the video channels may likewise be sent out to all devices, and configured either automatically (e.g. user preferences, etc.) or by manual settings of the master device (e.g. send video stream with Chinese subtitles to Device X, etc.).

Moreover, in a separate embodiment, such audio and/or video streams may be directed by the master device as desired. For example, in one embodiment, the master device may be associated with a bus touring company, and specific languages may be sent to specific devices based off of the occupants of the bus. Or, in a separate embodiment, each occupant may select the preferred language to be heard on the device, and based off of the temporary user preference, the applicable audio and/or video channel may be played.

In one embodiment, if a slave device is already playing media content, and the master device streams media content, the slave device may retain control as to whether the individually viewed content is continued to be played, or whether content from the master device is played. In another embodiment, preconfigured preferences on the salve device and/or the master device may be control automatic settings, including permitting the master device to automatically stream to and control the display on a slave device. Of course, in other embodiments, a slave device may be configured not to automatically cede control of the display to a master device. In such an embodiment, if media is streamed from a master device, a prompt may be displayed on a slave device requesting permission to display the media content from the master device.

In one embodiment, automatic streaming of content from a master device to one or more slave devices may include pushing content. For example, in one embodiment, the pushing of one or more streams (e.g. video, audio, etc.) may be managed by a master device and/or central device. In another embodiment, the pushing of streams may be controlled by a master device associated with a vehicle assembly (e.g. infotainment center device, etc.).

In another embodiment, streaming of content and subsequent display of content on one or more devices may be based on one or more triggers. For example, in various embodiments, a trigger (e.g. for controlling devices, for pushing content to devices, etc.) may be based off of location (e.g. GPS location, etc.), the type of users that are logged in (e.g. tourists, managers of the company, students of a class, etc.), the number of users that are logged in (e.g. threshold number of users triggers automatic direction by master device, etc.), and/or any other input which may influence how media content is streamed and/or displayed.

In one embodiment, if a master device is requesting content from a cloud-based source, the master device may request a specific size (e.g. screen dimensions, etc.) of the media content. For example, in one embodiment, the master device may detect ten devices on the network system, each of which has a different sized screen. The master device may determine that the largest screen size of the ten devices is 1600×900 pixels. As such, the master device may request form the cloud-based source the media content which would conform with the largest screen size of all of the devices on the network system. Once the media content has been received, the master device may optimize the received media content for other devices with smaller screen sizes on the network system.

In other embodiments, rather than the master device requesting the media content from a cloud-based source, the master device may request each individual slave device of different screen size to request and retrieve the media content based on the screen size of the device. Once received, the slave device may distribute (per the instructions of the master device) the media content to other devices having the same screen size.

In one embodiment, if the number of devices exceeds a set threshold, more than one master device (or a slave device given extended permissions) may be used to distribute and direct media content. For example, in some embodiments, having one master device may create a bottleneck as all requests are sent to one device, and media content is streamed from one device. In one embodiment, therefore, two or more master devices may work in conjunction in receiving requests and in distributing and directing media content. For example, if more than 20 devices are being controlled by one master device, another device may be promoted to function as a master device to assist in distributing the media content. In such an embodiment, the second master device may still receive commands and/or instruction from the first master device, but may otherwise be capable of distributing and directing media to one or more other devices.

Further yet, in one embodiment, one or more override features may be present in the network system. For example, in one embodiment, the vehicle assembly may include the ability to temporarily disable all permissions on devices and effectively act as a master device. In this embodiment, therefore, a parent may still retain control of devices within the vehicle system even while driving or otherwise controlling the vehicle.

In another embodiment, an override feature (e.g. to override an instruction from a master device, etc.) may be provided whereby a password, a keystroke, and/or any other input may be used to override the control of the master device (or the vehicle assembly).

In one embodiment, the audio and/or video channels may be associated with a hierarchy. For example, in one embodiment, a specific audio stream may not be accessible to all devices, but only those associated with specified metadata (e.g. position of manager, etc.). As such, video and/or audio streams may be selectively distributed. In other embodiments, network system resources may require no permissions. For example, in one embodiment, a backup camera on the vehicle may be accessed by any device on the network system.

Further yet, in one embodiment, the hierarchy of streams may change depending on the context of the input streams. For example, in one embodiment, if the vehicle is backing up and the back-up camera is activated, then the central device display may automatically show the video input stream from the back-up camera. In this embodiment, therefore, streams relating to safety make take precedence over less critical streams. Moreover, in other embodiments, a stream relating to a navigation update, or a news flash relating to an accident ahead, may take precedence over an entertainment stream. For example, the audio from a video being displayed on the devices may be temporarily muted to receive a more important update relating to navigation or a news flash.

In one embodiment, for those audio and/or video streams which may be accessed (e.g. by any slave device, by a device which has permissions, etc.), the device receiving the one or more streams may combine them with digital elements to form an augmented reality. For example, in one embodiment, a video stream from an outward-facing camera on the vehicle may be streamed to one or more slave devices, which may take the video stream and display it on the device and allow the user to interact with the input stream in some manner. For example, the input stream on the device may provide a constantly changing background upon which the user can trace images (e.g. draw or paint application, etc.), play a game (e.g. hop over identified obstacles, search for known targets, etc.), and/or interact with the input stream in any manner.

In various embodiments, the master device may direct where streams are played. For example, one or more devices may be associated with headphones. An incoming message may be localized and played on the headphones associated with the person to who the message is directed. Or, in another embodiment, if a navigation update occurs, rather than muting all speakers in the vehicle, the front speakers surrounding the driver may be muted to play the update. In this manner, therefore, the master device may direct where and how the streams are played.

Figure 12:
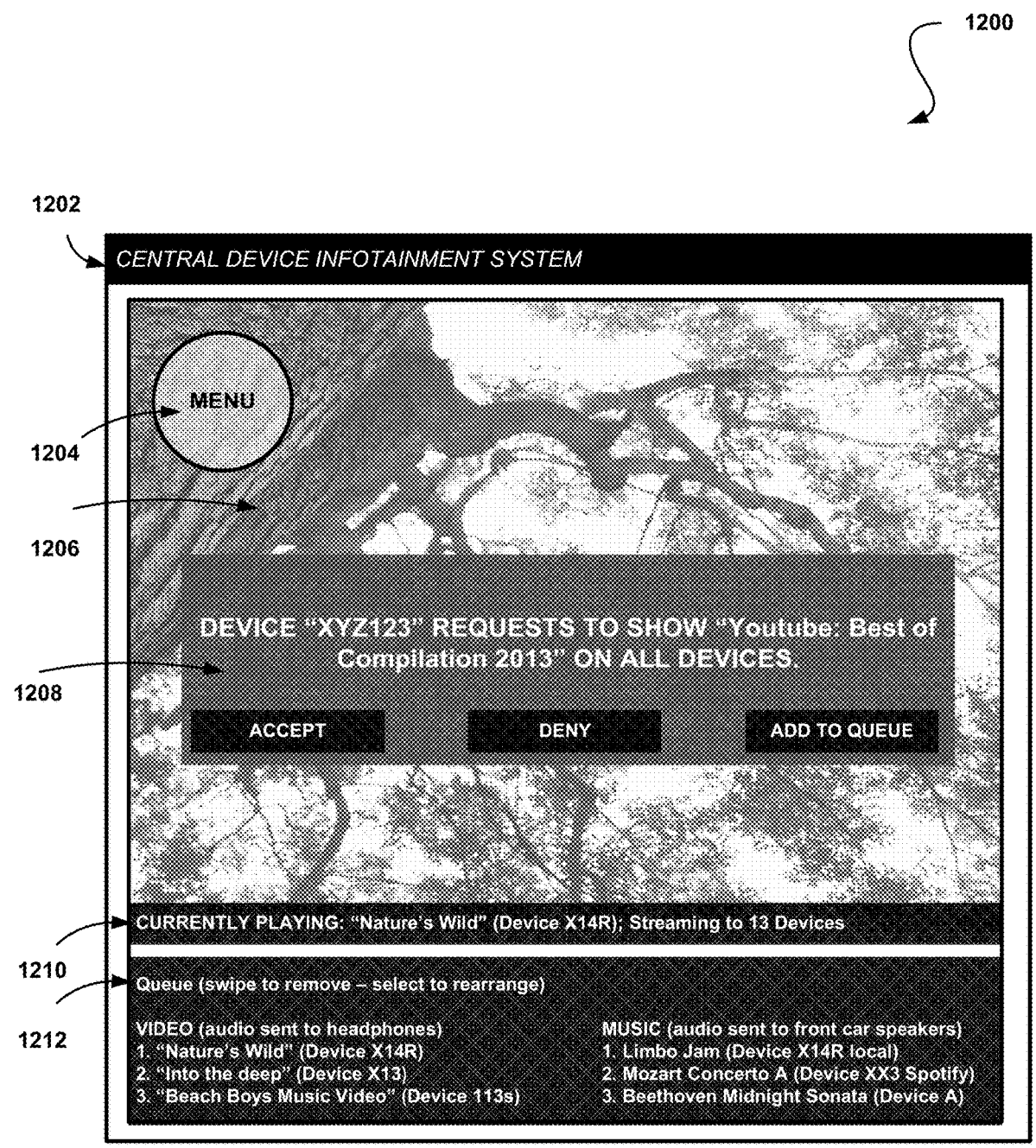
FIG. 12 shows a user interface for distributing and directing media content, in accordance with one possible embodiment.

FIG. 12 shows a user interface 1200 for distributing and directing media content, in accordance with one embodiment. As an option, the user interface 1200 may be implemented in the context of the details of any of the foregoing Figures. Of course, however, the user interface 1200 may be carried out in any desired environment. Further, the aforementioned definitions may equally apply to the description below.

As shown, the user interface 1200 may include a title bar 1202, a menu option 1204, a now playing interface 1206, a request 1208, a now playing pane 1210, and a queue 1212. In various embodiments, the elements may be rearranged, added to, and/or may include fewer items than that shown.

In one embodiment, the title bar may display information relating to the device. For example, in one embodiment, a device identification (e.g. Central Device Infotainment System, Master Device 1, Bob Device 1, etc.), network connectivity (e.g. WiFi connection, LAN connection, cellular connection, etc.), the number of devices connected to the network (e.g. 4 out of 6 devices in the vehicle are connected to the network system, etc.), the number of devices currently being managed by the device (e.g. all devices are being managed, 2 out of 4 devices are being managed, etc.), time (e.g. clock feature, etc.), information relating to the media content (e.g. amount of time left for the content, number of pictures left n the folder, amount of slides left in the presentation, etc.) may be displayed.

In another embodiment, the menu option may be displayed in any manner, including in response to a voice activation (e.g. "menu," etc.), in response to selecting the screen (e.g. causes a touch interface to be displayed, etc.), being a permanently displayed button, being a transparent button, and/or being displayed in any other manner. In one embodiment, the menu option may be displayed in response to an action taken by another device. For example, in one embodiment, a slave device may send a request to a master device to display media content on other devices. In response to receiving the request at the master device, one or more options, including a menu button, may be displayed.

In one embodiment, the now playing interface may include any media content currently being displayed and/or directed to other devices. For example, in various embodiments, the now playing interface may display a video being streamed to other devices, a presentation (e.g. powerpoint, etc.), a slideshow (e.g. photos, etc.), a visualization (e.g. associated with music, etc.), and/or nay other media content. In one embodiment, if a request is received at the device, the now playing media content may pause until the user gives an input (e.g. accepts or denies the request, etc.). In other embodiments, the now playing media content may continue to be displayed and played even if a request is received.

In some embodiments, the request may depend on permissions associated with the requesting device. For example, in one embodiment, a first device may have permission to stream media content to another device, but may not have permission granted to utilize the data connection of the another device. In such an embodiment, therefore, a request may be routed to a master device to approve allowing the first device to utilize the data connection of the another device. In another embodiment, the request may be directed to the device to which the request pertains. For example, in one embodiment, if the request relates to utilizing a data connection of a particular device, then the request will be sent to the device to which the data connection is desired to be used. In other embodiments, sending a request may be routed through the master device to the appropriate device. Further yet, if the request relates to two or more devices, then the request may be routed directly to the master device for approval.

As an example, a user may wish to share a video from a first device to all other devices located on the network system. In one embodiment, the user may send via the first device a request to the master device to approve sharing the video with all other devices. For example, the request may indicate "Device "XYZ123" requests to show "Youtube: best of Compilation 2013" on all devices" with the following options being displayed: "accept," "deny," and "add to queue." In another embodiment, any option may be displayed associated with the request, including the ability to modify the request (e.g. modify one or more elements, etc.), modify permissions needed for the request, manage the network (e.g. configure data connection configuration, etc.), and/or take any other action relating to the request.

In one embodiment, requests may be disabled if media content is being played by the master device. In another embodiment, a request may be displayed in a less obtrusive manner (e.g. bottom of screen, etc.) and/or may be associated with a time element (e.g. the request disappears after being displayed for 3 seconds, etc.).

Still yet, in another embodiment, a now playing pane may be permanent displayed at the bottom of the device display. In other embodiments, the now playing pane may be displayed in any manner, including displaying information relating to the media content (e.g. title, device source, number of devices the media content is being streamed to, time remaining, related media content available on the network system, etc.), displaying one or more actions associated with the media content (e.g. pause, play, stop, fast forward, rewind, etc.), being displayed in response to an input (e.g. touch, etc.) or a trigger (e.g. end of media content, incoming request, new device added to network system, etc.), and/or being displayed in any other manner and/or displaying any other information relating to the media content.

In one embodiment, the queue may include a list of items to be played on the network system. In one embodiment, more than one queue may exist, and may be associated with a media content type (e.g. video file, music file, photo file, etc.), a source device (e.g. a first slave device, etc.), a user (e.g. User_123, etc.), and/or any other association which may cause a separate queue to be created and/or displayed. In one embodiment, the queue may be associated only with a single device (e.g. queue for the specific device, etc.). In other embodiments, if the device was a master device, the queue may relate to one or more devices on a network system. In such an embodiment, the master device may have one or more queues being displayed, including a queue for audio content being played on the front speakers, a queue for video content being transmitted to specified devices, a queue of audio books being transmitted to a Bluetooth head receiver, and/or any other queue which may be associated with a master device.

In one embodiment, the queue may be automatically created and/or managed (e.g. based off of automatic inputs from other devices, based off of playlists, based off of cloud based media system, etc.). In other embodiments, the queue may be created and/or managed manually (e.g. select particular items to be played, individually approve of requests from other devices to be put into the queue, etc.). Of course, in a further embodiment, regardless of whether the queue is created automatically or manually, the queue may be modified as desired by the user, including deleting one or more media content (e.g. swipe the media content to the side to delete from the list, etc.), adding one or more media content (e.g. based on requests, browse network system to add media content, etc.), rearranging the listed media content (e.g. touch media content for predetermined time and then drag to desired position in queue list, etc.), and/or take any other action relating to the queue.

Figure 13:
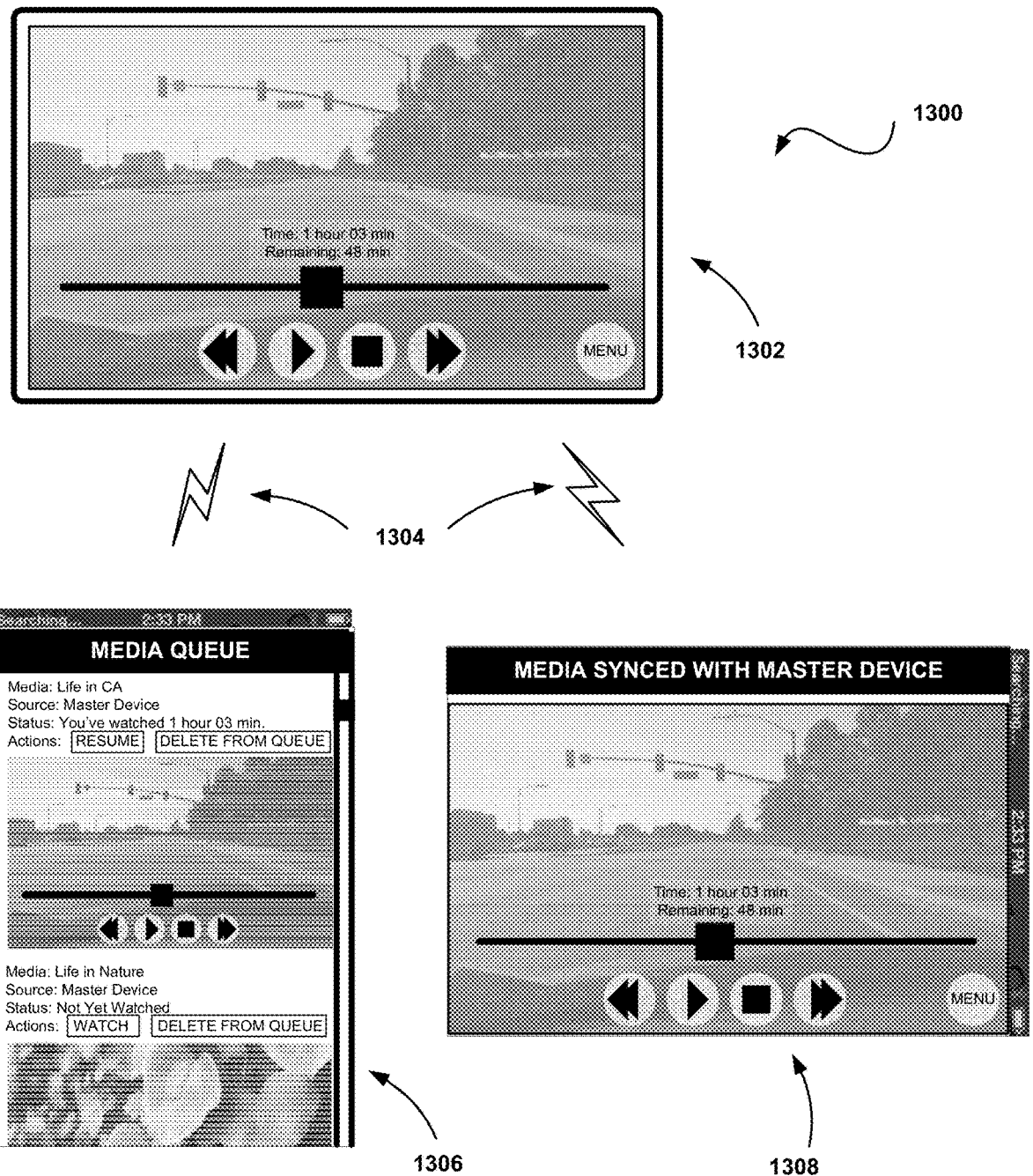
FIG. 13 shows user interfaces for distributing and directing media content, in accordance with one possible embodiment.

FIG. 13 shows user interfaces 1300 for distributing and directing media content, in accordance with one embodiment. As an option, the user interfaces 1300 may be implemented in the context of the details of any of the foregoing Figures. Of course, however, the user interfaces 1300 may be carried out in any desired environment. Further, the aforementioned definitions may equally apply to the description below.

As shown, user interfaces 1300 may include a master device interface 1302, one or more network connections 1304, a first slave device interface 1306, and a second slave device interface 1308.

In one embodiment, the master device interface may display a currently played media content. Further, in another embodiment, the master device interface may display that which is being displayed on all other displays and/or devices on the network system.

Moreover, in one embodiment, the master device interface may have global or device specific controls associated with the media content. For example, in one embodiment, controls relating to a video may include play, stop, forward, back, etc. In one embodiment, selecting a control (e.g. play, pause, etc.) on the master device may control the playback on any other device which is displaying the same media content. In other embodiments, the devices may retain playback control of the media content. Still yet, in one embodiment, the master device may have the capability to control a global playback (e.g. on all displays and/or devices, etc.) and control a master device (or any other device on the networks system) specific playback (e.g. playback on the master device, or any other specified device, may not be the same as the global playback, etc.).

In various embodiments, the master device may communicate with one or more other devices (e.g. slave devices, etc.) on the network system, using any type of network system (e.g. WAN, LAN, WLAN, Wi-Fi, Wi-Fi Direct, Bluetooth, etc.).

In one embodiment, a first slave device interface may include a media queue. For example, in various embodiments, the device interface may include one or more available media content on the network system, including media content on a master device, and/or media content made available on any other device within the network system. As an example, in one embodiment, the media queue my show a video which has been partly watched and which is being streamed from a master device. In such an embodiment, the user of the first slave device may wish to pause, fast forward, reverse, stop, and/or take any other action associated with the media content on the first slave device. In this manner, the first slave device may control how the media content is displayed. Of course, in other embodiments, the ability to take an action may depend on permissions from the master device (e.g. master device may retain control of displays of slave devices, etc.).

Further still, in one embodiment, the media queue may include one or more media content not yet viewed. In such an embodiment, the one or more media content may be rearranged, deleted, and/or otherwise configured as desired by the user.

In another embodiment, a second slave device, simultaneous in time to the first slave device, may display media content being streamed from a master device. In one embodiment, the second slave device may be in sync (e.g. with time, etc.) with the master device. For example, in one embodiment, the second slave device may indicate that the media content being displayed is synced with a master device, including "Media Synced with Master Device." Of course, any text may be displayed to indicate that the media content is in sync with the master device. In one embodiment, syncing media content with a master device may include displaying on the slave device the same thing which is being displayed on the master device.

Figure 14:
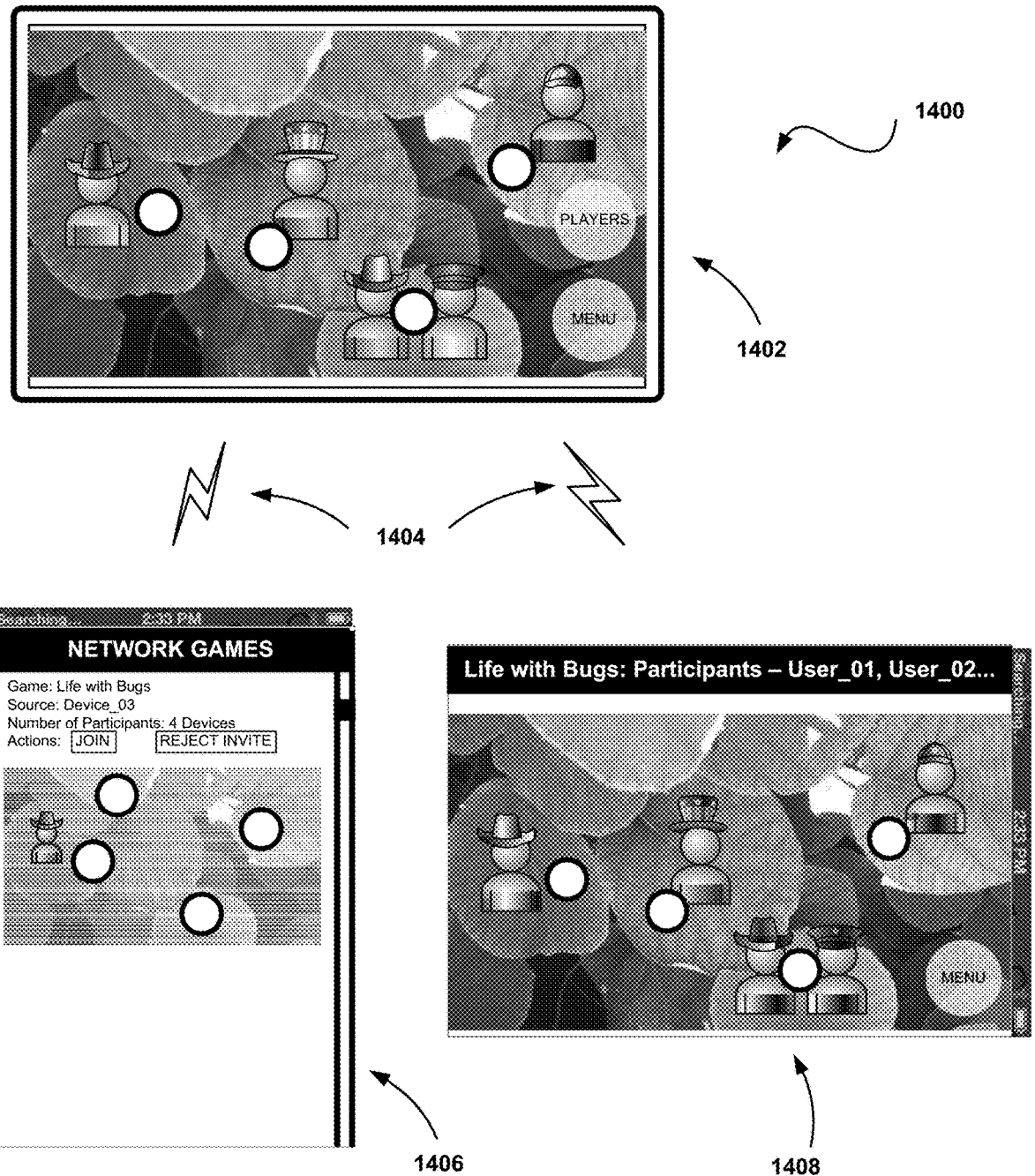
FIG. 14 shows user interfaces for distributing and directing media content, in accordance with one possible embodiment.

FIG. 14 shows user interfaces 1400 for distributing and directing media content, in accordance with one embodiment. As an option, the user interfaces 1400 may be implemented in the context of the details of any of the foregoing Figures. Of course, however, the user interfaces 1400 may be carried out in any desired environment. Further, the aforementioned definitions may equally apply to the description below.

As shown, user interfaces 1400 may include a master device interface 1402, one or more network connections 1404, a first slave device interface 1406, and a second slave device interface 1408.

In one embodiment, the master device interface may be optimized for a game. For example, in one embodiment the master device may include a view of all players on the network system playing a game, may display in real time events or statistics occurring in the game, and/or may display any other information associated with the game.

In another embodiment, the master device interface may permit the user of the master device to interact with the game. In this manner, the master device may permit the user of the master device to participate with the game. In another embodiment, the master device may take an inactive role in the game, and simply display information and/or settings and/or permissions relating to the playing of the game.

In various embodiments, the master device may communicate with one or more other devices (e.g. slave devices, etc.) on the network system, using any type of network system (e.g. WAN, LAN, WLAN, Wi-Fi, Wi-Fi Direct, Bluetooth, etc.).

In some embodiments, one or more slave devices (or master devices) may be used to interact with a game system.

For example, in one embodiment, a network system may be configured to allow one or more devices to communicate, initiate a game, and/or interact during the game. In such an embodiment, therefore, permissions associated with devices on the network system may be context based (e.g. permissions may be associated with the game on the device, etc.).

As an example, in one embodiment, a game may be started on a first slave device. Two other slave devices and one master device may wish to join the game and may do so. In one embodiment, all devices associated with the game system may have equal permissions, rights, and privileges as all other devices connected to the game, including the master device. In such an embodiment, therefore, all devices playing a game may be equally ranked in a hierarchy of devices. In a separate embodiment, the master device may retain one or more additional permissions (e.g. ability to kick off of a player, ability to restrict amount of time one or more specific users may participate in the game, etc.).

In one embodiment, the game system may be entirely based on devices located locally within the network system. In other embodiments, the game system may permit incorporating one or more cloud-based features (e.g. utilities, plugins, entire apps, users, systems, other network systems, etc.).

In another embodiment, latency considerations may determine one or more features associated with the game. For example, in various embodiments, a Wi-Fi connection may be switched to a LAN connection (or a Wi-Fi direct, or Bluetooth high speed, etc.) to accommodate the faster transfer of data, quality may be downgraded on the device so that real time updates occur more in real time (e.g. decreasing lag between the occurrence of the action and it being displayed on the user's device, etc.), devices may communicate device-to-device (e.g. Bluetooth, etc.) rather than via one central device to reduce bottleneck considerations, and/or any other feature associated with the game to optimize the gaming experience on the device.

Further still, in one embodiment, each device may be used to offload processing from a central device (e.g. to help reduce latency considerations, etc.). In a separate embodiment, a central device may be used to process inputs from one or more devices participating in the game.

As an example, in one embodiment, a first slave device may select to view available games being played by other devices on the network system. In one embodiment, the first slave device may be invited to participate in the game and may have a pending request displayed. In other embodiments, the first slave device may select to join the game, regardless of whether a request to join was sent by another device. Further still, in one embodiment, a thumbnail of the game may be displayed, showing a current status of the game.

In another embodiment, a user of a first slave device may start a separate new game on the slave device. In selecting to start a game, the user may be asked to invite one or more other devices located on the network system. In some embodiments, such a request may be sent to the master device for approval. In other embodiments, the request may be sent directly to the indicated device. In this manner, a user on a first device may initiate a game and invite other network devices to participate.

Still yet, in one embodiment, a user of a second slave device may display the game. Updates from other devices may be shown on the display. Additionally, in one embodiment, the user of the second slave device may have a "menu" function to change settings associated with the game. In contrast, a separate device (e.g. a master device, etc.) may have more than a "menu" option and may include a "players" option (e.g. to approve/deny players, etc.), and/or any other option associated with the game.

Figure 15:
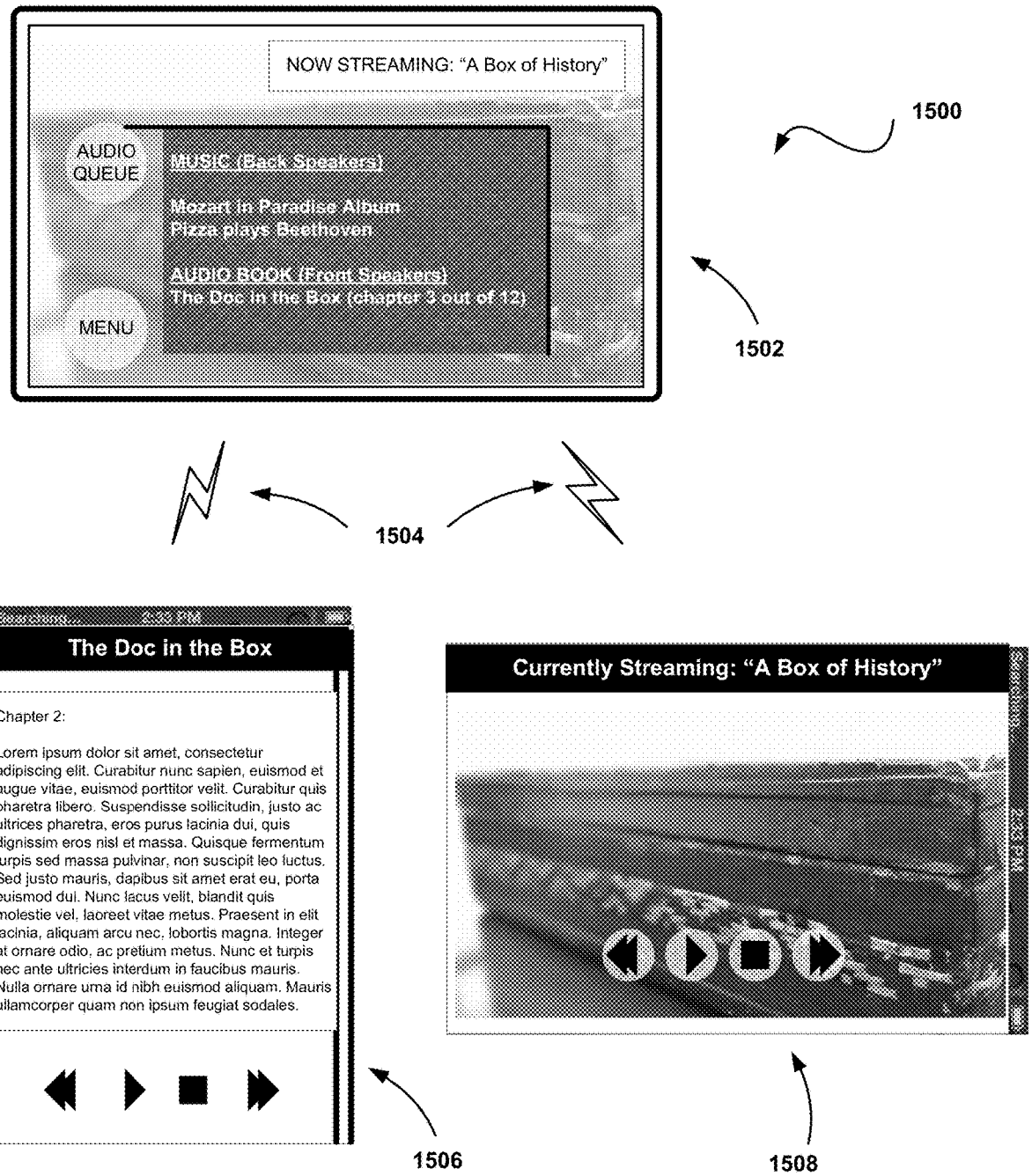
FIG. 15 shows user interfaces for distributing and directing media content, in accordance with one possible embodiment.

FIG. 15 shows user interfaces 1500 for distributing and directing media content, in accordance with one embodiment. As an option, the user interfaces 1500 may be implemented in the context of the details of any of the foregoing Figures. Of course, however, the user interfaces 1500 may be carried out in any desired environment. Further, the aforementioned definitions may equally apply to the description below.

As shown, user interfaces 1500 may include a master device interface 1502, one or more network connections 1504, a first slave device interface 1506, and a second slave device interface 1508.

In one embodiment, a master device interface may display in a background video content being streamed to (or approved to be fetched by) one or more other devices. Additionally, in one embodiment, the master device interface may display an audio queue. For example, in one embodiment, the audio queue may relate to any audio content listed to be played in the network system, including, a list of music to be played on back speakers, a specific audio book to be played on front speakers, and video media content to be sent to Bluetooth headphones (or to a channel or specific audio jack located within the network system, etc.).

In various embodiments, the master device may communicate with one or more other devices (e.g. slave devices, etc.) on the network system, using any type of network system (e.g. WAN, LAN, WLAN, Wi-Fi, Wi-Fi Direct, Bluetooth, etc.).

In one embodiment, a first slave device interface may include information associated with an audio book. For example, in one embodiment, the slave device may have the ability to control the playback of the audio boo, and/or may have the ability to read the text associated with the audio book. In some embodiments, the audio book media content may be located on the slave device, a master device, and/or any other device associated with the network system (e.g. local or remote, etc.).

In another embodiment, a second slave device, simultaneous in time to the first slave device, may display a video (e.g. "A Box of History," etc.) being streamed from a master device. In this manner, therefore, audio, text, video, music, and/or any other media content may be made available to one or more devices on the network system.

Figure 16:
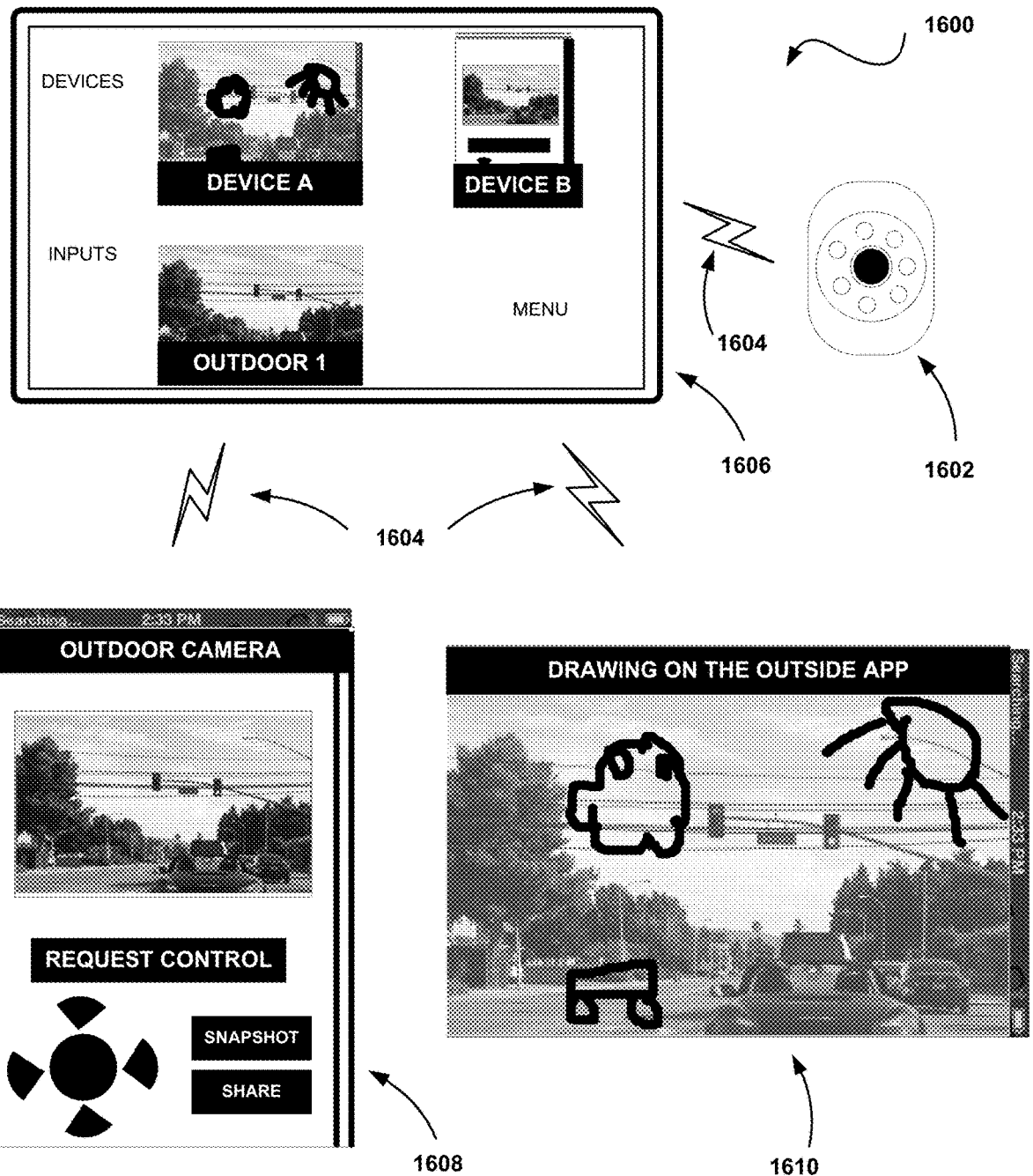
FIG. 16 shows user interfaces for distributing and directing media content, in accordance with one possible embodiment.

FIG. 16 shows user interfaces 1600 for distributing and directing media content, in accordance with one embodiment. As an option, the user interfaces 1600 may be implemented in the context of the details of any of the foregoing Figures. Of course, however, the user interfaces 1600 may be carried out in any desired environment. Further, the aforementioned definitions may equally apply to the description below.

As shown, user interfaces 1600 may include a camera 1602, a master device interface 1606, one or more network connections 1604, a first slave device interface 1608, and a second slave device interface 1610.

In one embodiment, the camera may be associated with a vehicular assembly system (e.g. integrated into the car, etc.). In other embodiments, the camera (or any other nearby resource) may be independent of any other system and may be operated and/or controlled by one or more devices on the network system. As an example, a back up camera on a car may be used by one or more devices. However, in some embodiments, a back up camera may only be controlled by one device at a time (e.g. with sufficient permissions and/or privileges, etc.).

In other embodiments, a resource may include any type of camera (e.g. webcam, point-and-shoot camera, etc.), a disc player (e.g. Blueray disk player, etc.), a media player, and/or any other device which might provide some input (e.g. data input, etc.). In a separate embodiment, a resource associated with a device (e.g. gyroscope, accelerometer, etc.) may be used as an input by another device. Of course, however, in some embodiments, a sensor may not be controlled by a device (i.e. a sensor may only provide an output and not allow for manipulation by another device, etc.).

In one embodiment, a master display interface may include displaying one or more thumbnail images associated with devices and/or inputs. For example, in one embodiment, the master display interface may display a thumbnail image of what is being displayed on every device within the network system, as well as display a thumbnail image of any other input (e.g. camera, media player, etc.). In this manner, therefore, the master device may display at a glance a status of all devices and/or inputs associated with the network system.

In various embodiments, the master device may communicate with one or more other devices (e.g. slave devices, etc.) on the network system, using any type of network system (e.g. WAN, LAN, WLAN, Wi-Fi, Wi-Fi Direct, Bluetooth, etc.).

In one embodiment, the first slave device interface may include the ability to view an outdoor camera associated with the network system. Further, in another embodiment, the first slave device may have permission to request control of the device (e.g. if another master device is not currently using the camera, etc.). In other embodiments, the first slave device may provide the ability to take a snapshot image of what is being displayed by the camera device, or may select to share the live feed of the camera (or of a snapshot, etc.) as desired (e.g. with other users on the network system, send to email recipient, etc.).

In another embodiment, the second slave device interface may include the ability to interact with one or more network resources. For example, in one embodiment, a camera device associated with the network system may be used as an augmented reality input on a drawing app. For example, the input stream from the camera may provide the background for the app upon which the user may interact by drawing images. In one embodiment, because the background may be constantly changing, the images created by the user may only be displayed for a set number of seconds (e.g. two seconds, etc.) before fading away. In other embodiments, the camera input may be used in any other manner to provide an augmented reality experience for the user of the device. Further still, any resource (e.g. sensors, inputs, etc.) may be used to assist in creating an augmented reality experience for the user of the device.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
    code configured to receive, at an entertainment device
        from a first mobile device including a first cellular phone, a request to stream a first portion of media content where the first portion of media content includes cloud-based media;

code configured to direct, by the entertainment device, the first mobile device to retrieve and process the first portion of media content from a cloud;

code configured to temporarily grant to the first mobile device, by the entertainment device, an ability to stream media content to the entertainment device;

code configured to receive from the first mobile device at the entertainment device the first portion of media content, where the first portion of media content is optimized by the first mobile device for a display size associated with the entertainment device;

code configured to send, by the entertainment device, the first portion of media content to a display;

code configured to receive, at the entertainment device from a second mobile device including a second cellular phone, a request to stream a second portion of media content, where the request is received during a sending of the first portion of media content to the display;

code configured to revoke from the first mobile device the ability to stream media content to the entertainment device, and transfer to the second mobile device the ability to stream media content to the entertainment device, in response to determining that the first mobile device has finished streaming the first portion of media content to the entertainment device;

code configured to receive from the second mobile device at the entertainment device the second portion of media content, where the second portion of media content is processed at the second mobile device; and code configured to send, by the entertainment device, the second portion of media content to the display.

2. The computer program product of claim 1, further comprising:

code configured to receive, at the entertainment device, credentials from a user;

code configured to automatically switch the entertainment device from a slave device to a master device, in response to receiving the credentials, wherein the master device is provided with content that is different from content provided to the slave device;

code configured to receive, at the entertainment device, a voice command for a third portion of media content;

code configured to retrieve, by the entertainment device, the third portion of media content;

code configured to send, by the entertainment device, the third portion of media content to the display;

code configured to receive, by the entertainment device, an identification of an available screenshare from a third mobile device;

code configured to receive, by the entertainment device, a selection of the available screenshare for viewing; and code configured to enable, by the entertainment device, the available screenshare for viewing on the display.

3. The computer program product of claim 1, wherein the entertainment device controls a presentation by the entertainment device of the first portion of media content received from the first mobile device, and the entertainment device controls the presentation by the entertainment device of the second portion of media content received from the second mobile device.

4. The computer program product of claim 1, wherein the second portion of media content is stored on a device located on a same network system as the first mobile device and the second mobile device.

5. The computer program product of claim 1, wherein the second portion of media content is stored on a device located remotely from a network system associated with the first mobile device and the second mobile device.

6. The computer program product of claim 1, wherein a selection of the first portion of media content is received as a voice command at the first mobile device and the second mobile device.

7. The computer program product of claim 1, wherein the entertainment device is connected to a car infotainment system.

8. The computer program product of claim 1, wherein the first mobile device controls a presentation by the entertainment device of the second portion of media content received from the second mobile device.

9. The computer program product of claim 1, further comprising:

providing, by the entertainment device, a plurality of available screenshares to be viewed using the display;

receiving a selection of one of the plurality of available screenshares; and displaying the selected one of the plurality of available screenshares on the display.

10. The computer program product of claim 1, further comprising:

receiving, at the entertainment device during the sending of the first portion of media content to the display, a request to display additional media content;

accepting the request; and displaying, during the sending of the first portion of media content to the display, the additional media content, using the display.

11. The computer program product of claim 1, further comprising controlling, by the entertainment device, a presentation of the first portion of media content, including pausing and stopping the presentation of the first portion of media content.

12. The computer program product of claim 1, wherein the first portion of media content and the second portion of media content are processed in set sections, where each of the set sections are processed and distributed to the display in a display-specific and optimized format.

13. A method, comprising:

receiving, at an entertainment device from a first mobile device including a first cellular phone, a request to stream a first portion of media content, where the first portion of media content includes cloud-based media;

directing, by the entertainment device, the first mobile device to retrieve and process the first portion of media content from a cloud;

temporarily granting to the first mobile device, by the entertainment device, an ability to stream media content to the entertainment device;

receiving from the first mobile device at the entertainment device the first portion of media content, where the first portion of media content is optimized by the first mobile device for a display size associated with the entertainment device;

sending, by the entertainment device, the first portion of media content to a display;

receiving, at the entertainment device from a second mobile device including a second cellular phone, a request to stream a second portion of media content where the request is received during a sending of the first portion of media content to the display;

revoking from the first mobile device the ability to stream media content to the entertainment device, and transferring to the second mobile device the ability to stream media content to the entertainment device, in response to determining that the first mobile device has finished streaming the first portion of media content to the entertainment device;

receiving from the second mobile device at the entertainment device the second portion of media content, where the second portion of media content is processed at the second mobile device; and sending, by the entertainment device, the second portion of media content to the display.

14. A system comprising:

a memory system; and one or more processors coupled to the memory system and that are each configured to:

receive, at an entertainment device from a first mobile device including a first cellular phone, a request to stream a first portion of media content, where the first portion of media content includes cloud-based media;

direct, by the entertainment device, the first mobile device to retrieve and process the first portion of media content from a cloud;

temporarily grant to the first mobile device, by the entertainment device, an ability to stream media content to the entertainment device;

receive from the first mobile device at the entertainment device the first portion of media content, where the first portion of media content is optimized by the first mobile device for a display size associated with the entertainment device;

send, by the entertainment device, the first portion of media content to a display;

receive, at the entertainment device from a second mobile device including a second cellular phone, a request to stream a second portion of media content, where the request is received during a sending of the first portion of media content to the display;

revoke from the first mobile device the ability to stream media content to the entertainment device, and transfer to the second mobile device the ability to stream media content to the entertainment device, in response to determining that the first mobile device has finished streaming the first portion of media content to the entertainment device;

receive from the second mobile device at the entertainment device the second portion of media content, where the second portion of media content is processed at the second mobile device; and send, by the entertainment device, the second portion of media content to the display.

\* \* \* \* \*